United States Patent
Sasaki

(10) Patent No.: US 11,945,214 B2
(45) Date of Patent: Apr. 2, 2024

(54) PROCESSING DEVICE

(71) Applicant: SEIKO EPSON CORPORATION, Tokyo (JP)

(72) Inventor: Tsuneyuki Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 548 days.

(21) Appl. No.: 17/162,336

(22) Filed: Jan. 29, 2021

(65) Prior Publication Data
US 2021/0237444 A1   Aug. 5, 2021

(30) Foreign Application Priority Data

Jan. 31, 2020   (JP) .................................. 2020-014611

(51) Int. Cl.
| | |
|---|---|
| *B41J 11/00* | (2006.01) |
| *G01N 21/3559* | (2014.01) |
| *G01N 27/22* | (2006.01) |
| *B41J 2/045* | (2006.01) |

(52) U.S. Cl.
CPC ...... *B41J 11/0095* (2013.01); *G01N 21/3559* (2013.01); *G01N 27/223* (2013.01); *B41J 2/04556* (2013.01); *B41J 11/002* (2013.01); *B41J 2203/01* (2020.08)

(58) Field of Classification Search
CPC .................................................... B41J 11/009
See application file for complete search history.

(56) References Cited

U.S. PATENT DOCUMENTS

| | | | |
|---|---|---|---|
| 8,588,632 B2 | 11/2013 | Ohshima et al. | |
| 2012/0237231 A1* | 9/2012 | Ohshima ................ | B41J 11/009 399/45 |
| 2014/0236021 A1* | 8/2014 | Islam ................... | A61B 5/0091 600/475 |
| 2016/0152052 A1* | 6/2016 | Namiki .............. | G01N 29/4427 73/602 |
| 2018/0148288 A1* | 5/2018 | Sugai ........................ | B65H 7/02 |
| 2019/0162672 A1* | 5/2019 | Sakakibara ............ | G01N 21/89 |

(Continued)

FOREIGN PATENT DOCUMENTS

| | | |
|---|---|---|
| JP | H08-054264 | 2/1996 |
| JP | H08-082597 | 3/1996 |

(Continued)

*Primary Examiner* — Shelby L Fidler
(74) *Attorney, Agent, or Firm* — WORKMAN NYDEGGER

(57) ABSTRACT

A processing device includes a first light source and a second light source configured to emit light having a peak wavelength from 900 nm to 2,100 nm, a first light receiving portion, a second light receiving portion, and a processing portion configured to subject a medium to processing of increasing or reducing an amount of moisture contained in the medium. the first light source and the first light receiving portion are positioned upstream of the processing portion in a transport direction of the medium, the first light source irradiates, with light, the medium, the first light receiving portion receives light reflected by the medium, the second light source and the second light receiving portion are positioned downstream of the processing portion in the transport direction, the second light source irradiates, with light, the medium, and the second light receiving portion receives light reflected by the medium.

6 Claims, 8 Drawing Sheets

(56) References Cited

U.S. PATENT DOCUMENTS

2021/0252878 A1* 8/2021 Ishii .................... B41J 11/0095
2021/0252880 A1* 8/2021 Ishii .................... B41J 11/0095

FOREIGN PATENT DOCUMENTS

| JP | H09-105716  | 4/1997  |
|----|-------------|---------|
| JP | 2002-214039 | 7/2002  |
| JP | 2012-194361 | 10/2012 |
| JP | 2017-181060 | 10/2017 |
| JP | 2018-018023 | 2/2018  |
| JP | 2018-044929 | 3/2018  |

* cited by examiner

PROCESSING DEVICE

The present application is based on, and claims priority from JP Application Serial Number 2020-014611, filed Jan. 31, 2020, the disclosure of which is hereby incorporated by reference herein in its entirety.

BACKGROUND

1. Technical Field

The disclosure relates to a processing device.

2. Related Art

As one example of a processing device that subjects a medium to processing, JP-A-2017-181060 describes an image formation device that subjects a medium to printing. The image formation device includes a sensor that detects surface roughness of the medium. The image formation device differentiates glossiness of the medium, based on the surface roughness of the medium detected by the sensor. The image formation device differentiates types of the medium, based on the glossiness of the medium. The image formation device subjects the medium to printing in accordance with its type by differentiating the types of the medium.

Surface roughness of media may differ in some cases even in a case of media of the same type. Regardless of surface roughness of media, characteristics may differ for each medium in a case of media of the same type. For example, even when media of the same type are subjected to the same processing, change in amount of moisture contained in the media may differ for each medium. An amount of moisture contained in a medium largely affects printing quality of the medium. Thus, in the processing device, it is important to detect change in amount of moisture contained in the medium subjected to the processing.

SUMMARY

In order to solve the above-mentioned problem, a processing device includes a first light source and a second light source configured to emit light having a peak wavelength from 900 nm to 2,100 nm, a first light receiving portion configured to receive light emitted from the first light source, a second light receiving portion configured to receive light emitted from the second light source, a support portion configured to support a medium to be transported, and a processing portion configured to subject the medium to processing of increasing or reducing an amount of moisture contained in the medium, the processing portion facing the support portion, wherein the first light source and the first light receiving portion are positioned upstream of the processing portion in a transport direction of the medium to be transported, the first light source irradiates, with light, the medium before being subjected to processing by the processing portion, the first light receiving portion receives light reflected by the medium, the second light source and the second light receiving portion are positioned downstream of the processing portion in the transport direction, the second light source irradiates, with light, the medium after being subjected to processing by the processing portion, and the second light receiving portion receives light reflected by the medium.

DESCRIPTION OF EXEMPLARY EMBODIMENTS

With reference to the drawings, a printing system including a processing device of one exemplary embodiment is described below.

First Embodiment

Figure 1:
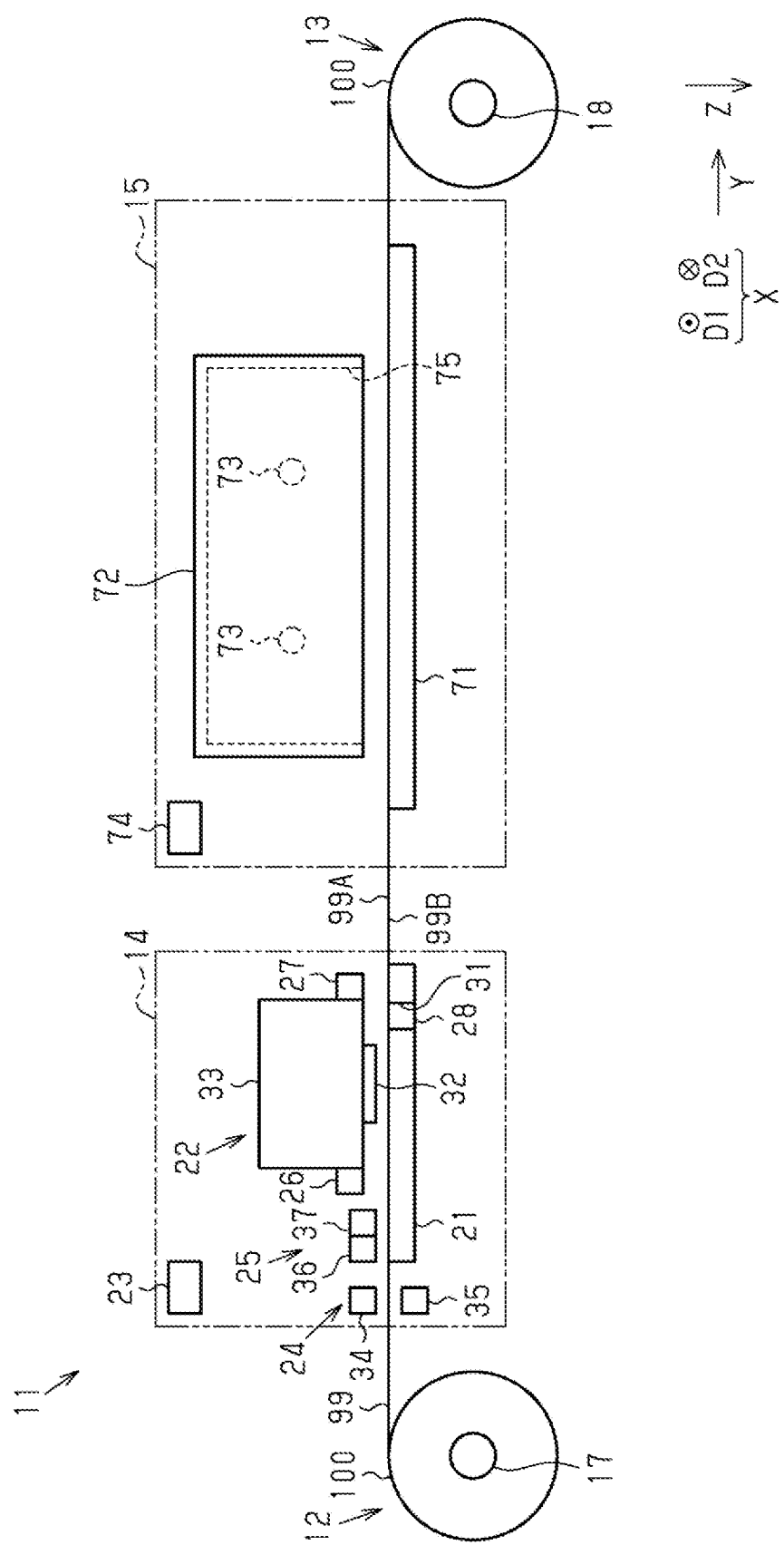
FIG. 1 is a schematic view illustrating a printing system including a processing device of a first exemplary embodiment.

As illustrated in FIG. 1, a printing system 11 of the first exemplary embodiment includes a retaining device 12, a winding device 13, a printing device 14, and a drying device 15.

The retaining device 12 is a device that retains a roll body 100 obtained by winding a medium 99 in an overlapping manner. The retaining device 12 includes a retaining shaft 17 that retains the roll body 100. For example, the retaining shaft 17 in configured to be rotatable. The medium 99 is fed from the roll body 100 along with rotation of the retaining shaft 17. In the first exemplary embodiment, instead of actively rotating, the retaining shaft 17 is rotated together with the roll body 100, for example, while the medium 99 is pulled from the roll body 100. The medium 99 is a sheet such as a paper sheet and fabric. The retaining shaft 17 may be configured to be unrotatable. In this case, the roll body 100 is rotated with respect to the retaining shaft 17 while the medium 99 is pulled from the roll body 100.

The winding device 13 is a device that winds the medium 99 fed from the retaining device 12. The winding device 13 includes a winding shaft 18 that the medium 99. The winding shaft 18 is configured to be rotatable. The winding shaft 18 winds the medium 99 along with rotation. As a result, the winding shaft 18 retains the roll body 100 formed by winding the medium 99. In the first exemplary embodiment, while the winding shaft 18 is rotated, the medium 99 is fed from the roll body 100 retained by the retaining shaft 17.

The medium 99 is transported by being wound by the winding device 13. The medium 99 is transported from the retaining device 12 to the winding device 13. In the first exemplary embodiment, a direction from the retaining device 12 to the winding device 13 is a transport direction Y of the medium 99. The medium 99 includes a front surface 99A and a back surface 99B being a surface opposite to the front surface 99A.

The printing device 14 is a device that subjects the medium 99 to printing. For example, the printing device 14 is an ink jet-type printer that records an image such as characters, photographs, and figures, on the medium 99 by ejecting ink being one example of liquid. In the first exemplary embodiment, the printing device 14 is one example of a processing device. Specifically, the printing device 14 subjects the medium 99 to processing by subjecting the medium 99 to printing.

The printing device 14 is positioned between the retaining device 12 and the winding device 13 in the transport direction Y. More specifically, the printing device 14 is positioned between the retaining device 12 and the drying device 15 in the transport direction Y. Thus, the medium 99 fed from the retaining device 12 passes through the printing device 14 and the drying device 15 in the stated order.

The printing device 14 includes a first support portion 21, a printing unit 22, and a first control unit 23. The printing device 14 includes a first ultrasonic wave sensor 24 and a second ultrasonic wave sensor 25. The printing device 14 includes a first optical sensor 26 and a second optical sensor 27. The printing device 14 includes an electrostatic capacitance sensor 28.

For example, the first support portion 21 is a plate-like member. The first support portion 21 supports the medium 99. The first support portion 21 of the first exemplary embodiment supports the medium 99 from below. The first support portion 21 of the first exemplary embodiment is brought into contact with the back surface 99B of the medium 99. The first support portion 21 is a support portion included in the printing device 14 in the printing system 11. The first support portion 21 of the first exemplary embodiment has a mounting hole 31 for mounting the electrostatic capacitance sensor 28.

The printing unit 22 faces the first support portion 21. The printing unit 22 of the first exemplary embodiment is positioned above the first support portion 21. The printing unit 22 is configured to subject the medium 99 to printing. The printing unit 22 of the first exemplary embodiment includes a head 32 and a carriage 33.

The head 32 faces the first support portion 21. The head 32 of the first exemplary embodiment is positioned above the first support portion 21. The head 32 ejects liquid onto the medium 99 supported by the first support portion 21. As a result, an image is printed on the medium 99. The head 32 of the first exemplary embodiment ejects the liquid onto the front surface 99A of the medium 99. For example, the liquid ejected from the head 32 is aqueous ink composed of a water as a solvent.

When the head 32 ejects the liquid onto the medium 99, an amount of moisture contained in the medium 99 is increased. Specifically, the head 32 ejects the liquid onto the medium 99, and thus subjects the medium 99 to processing of increasing an amount of moisture contained in the medium 99. The head 32 subjects the front surface 99A of the medium 99 to processing, which is opposite to the back surface 99B with which the first support portion 21 is brought into contact. In this respect, the head 32 of the first exemplary embodiment is one example of a processing portion.

The carriage 33 mounts the head 32 thereon. The carriage 33 faces the first support portion 21. The carriage 33 of the first exemplary embodiment is positioned above the first support portion 21. The carriage 33 scans the transported medium 99. Specifically, the carriage 33 reciprocates along the width of the medium 99 above the first support portion 21. In this case, the carriage 33 reciprocates in a scanning direction X.

The scanning direction X indicates both directions including a first direction D1 and the second direction D2. The first direction D1 is a direction opposite to the second direction D2. The first direction D1 and the second direction D2 are directions different from the transport direction Y and a vertical direction Z.

The printing device 14 of the first exemplary embodiment is a serial printer in which the head 32 scans the medium 99. The printing device 14 may be a line printer in which the head 32 ejects the liquid all at once along the width of the medium 99.

The first control unit 23 controls the various configurations of the printing device 14. For example, the first control unit 23 controls the printing unit 22. The first control unit 23 is a control unit included in the printing device 14 in the printing system 11.

The first control unit 23 of the first exemplary embodiment is communicable with the retaining device 12, the winding device 13, and the drying device 15. As required, the first control unit 23 receives a signal from the retaining device 12, the winding device 13, and the drying device 15, and transmits a signal to the retaining device 12, the winding device 13, and the drying device 15. The first control unit 23 may integrally control the printing system 11.

The first control unit 23 may be configured as α: one or more processors that executes various processing in accordance with computer programs, β: one or more special purpose hardware circuit such as a special purpose integrated circuit, which executes at least part of processing of the various processing, or γ: a circuit including a combination of those. The processor includes a CPU and a memory such as a RAM and a ROM, and the memory stores program codes or commands configured to cause the CPU to execute processing. The memory, or a computer readable medium includes any readable medium accessible by a general purpose or special purpose computer.

Figure 2:
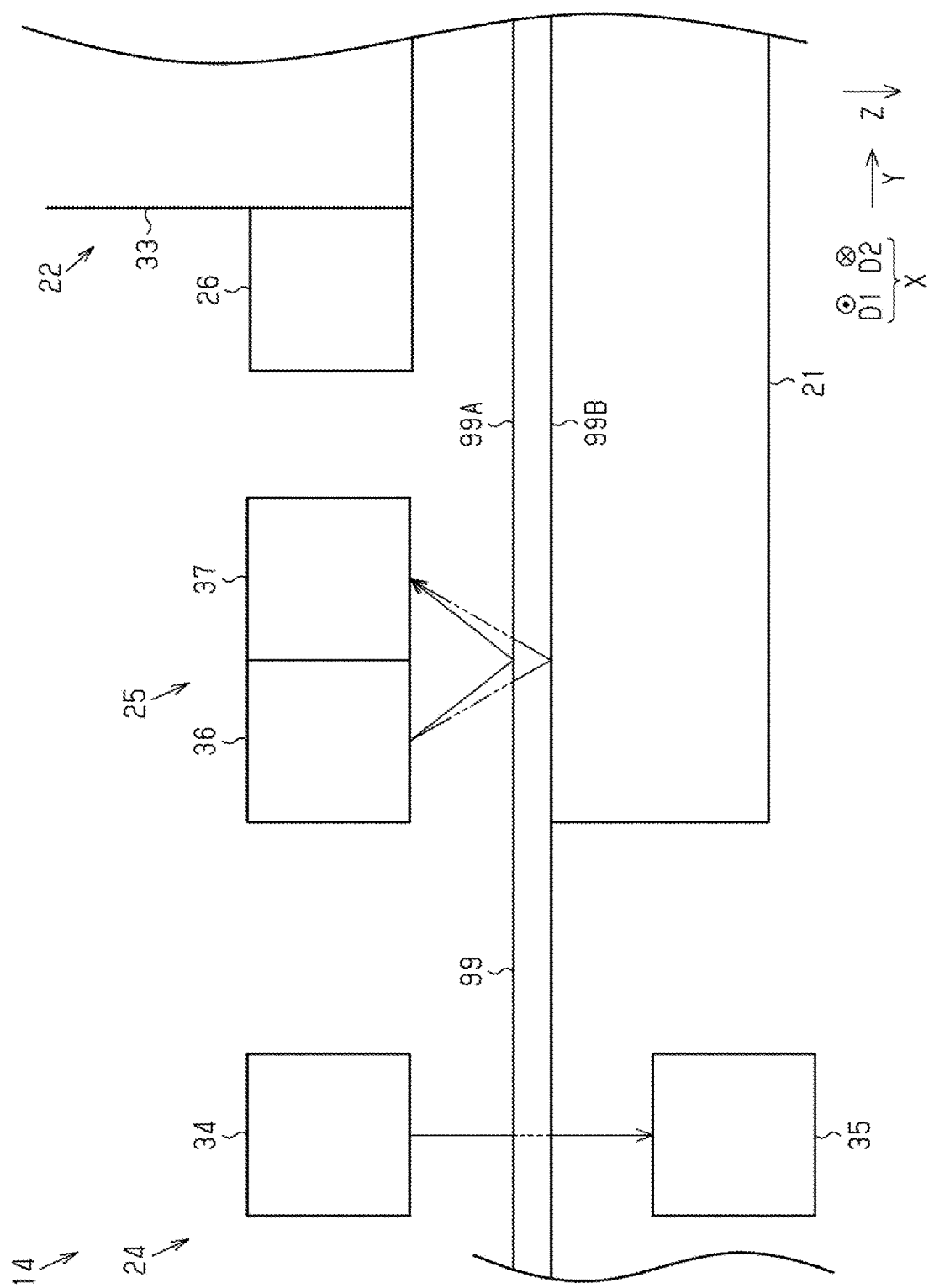
FIG. 2 is an enlarged view of FIG. 1.

As illustrated in FIG. 2, the first ultrasonic wave sensor 24 is positioned upstream of the first support portion 21 in the transport direction Y, for example. The first ultrasonic wave sensor 24 includes a first transmission portion 34 and a first reception portion 35. The first transmission portion 34 and the first reception portion 35 are positioned to sandwich the transported medium 99. In the first exemplary embodiment, the first transmission portion 34 and the first reception portion 35 are positioned to sandwich the transported medium 99 from above and below. Specifically, the medium 99 is transported to pass between the first transmission portion 34 and the first reception portion 35.

For example, the first transmission portion 34 is positioned above the first reception portion 35. The first transmission portion 34 is configured to transmit an ultrasonic wave. The first transmission portion 34 transmits an ultrasonic eave to the first reception portion 35. Specifically, the first transmission portion 34 transmits an ultrasonic wave downward. Thus, when the medium 99 is positioned between the first transmission portion 34 and the first reception portion 35, an ultrasonic wave transmitted from the first transmission portion 34 irradiates the medium 99. In this case, an ultrasonic wave transmitted from the first transmission portion 34 irradiates the medium 99 before printing. When the medium 99 is not positioned between the first transmission portion 34 and the first reception portion 35, an ultrasonic wave transmitted from the first transmission portion 34 directly irradiates the first reception portion 35.

For example, the first reception portion 35 is positioned below the first transmission portion 34. The first reception portion 35 is configured to receive an ultrasonic wave. The first reception portion 35 receives an ultrasonic wave transmitted from the first transmission portion 34. Specifically, the first reception portion 35 receives an ultrasonic wave radiated from above. Thus, when the medium 99 is present between the first transmission portion 34 and the first reception portion 35, the first reception portion 35 receives an ultrasonic wave that is transmitted from the first transmission portion 34 and passes through the medium 99. In this case, the first reception portion 35 receives an ultrasonic wave passing through the medium 99 before printing. When the medium 99 is not present between the first transmission portion 34 and the first reception portion 35, the first reception portion 35 directly receives an ultrasonic wave transmitted from the first transmission portion 34.

An ultrasonic wave transmitted from the first transmission portion 34 attenuates while passing through the medium 99. Thus, when the medium 99 is present between the first transmission portion 34 and the first reception portion 35, intensity of an ultrasonic wave received by the first reception portion 35 is lower than a case where the medium 99 is not positioned between the first transmission portion 34 and the first reception portion 35. An attenuation degree of an ultrasonic wave passing through the medium 99 varies depending on density, thickness, or the like of the medium 99.

Based on intensity of an ultrasonic wave received by the first reception portion 35 when the medium 99 is positioned between the first transmission portion 34 and the first reception portion 35, and intensity of an ultrasonic wave received by the first reception portion 35 when the medium 99 is not positioned between the first transmission portion 34 and the first reception portion 35, transmittance of an ultrasonic wave with respect to the medium 99 is detected. Transmittance of an ultrasonic wave with respect to the medium 99 indicates a ratio of an ultrasonic wave that passes through the medium 99 with respect to an ultrasonic wave transmitted from the first transmission portion 34.

Transmittance of an ultrasonic wave with respect to the medium 99 and a basis weight of the medium 99 are inter-related. For example, as transmittance of an ultrasonic wave with respect to the medium 99 is higher, a basis weight of the medium 99 is smaller. As transmittance of an ultrasonic wave with respect to the medium 99 is lower, a basis weight of the medium 99 is larger. In this manner, based on transmittance of an ultrasonic wave with respect to the medium 99, a basis weight of the medium 99 is detected. Therefore, the first ultrasonic wave sensor 24 is a sensor that detects a basis weight of the medium 99. The first control unit 23 may calculate a basis weight of the medium 99, based on a signal transmitted from the first ultrasonic wave sensor 24.

The second ultrasonic wave sensor 25 is positioned upstream of the printing unit 22 in the transport direction Y, for example. The second ultrasonic wave sensor 25 of the first exemplary embodiment is positioned between the first ultrasonic wave sensor 24 and the printing unit 22 in the transport direction Y.

The second ultrasonic wave sensor 25 includes a second transmission portion 36 and a second reception portion 37. The second transmission portion 36 and the second reception portion 37 face the first support portion 21. The second transmission portion 36 and the second reception portion 37 are positioned above the first support portion 21. In the first exemplary embodiment, the second transmission portion 36 and the second reception portion 37 are arrayed in the transport direction Y in the stated order.

The second transmission portion 36 is configured to transmit an ultrasonic wave. The second transmission portion 36 transmits an ultrasonic wave downward. The second transmission portion 36 irradiates the medium 99 or the first support portion 21 with an ultrasonic wave. Specifically, when the medium 99 is positioned below the second transmission portion 36, the second transmission portion 36 irradiates the medium 99 with an ultrasonic wave. In this case, the second transmission portion 36 irradiates the front surface 99A of the medium 99 with an ultrasonic wave. When the medium 99 is not positioned below the second transmission portion 36, the second transmission portion 36 irradiates the first support portion 21 with an ultrasonic wave.

An ultrasonic wave transmitted from the second transmission portion 36 is reflected by the medium 99 or the first support portion 21. In the first exemplary embodiment, when the medium 99 is positioned below the second transmission portion 36, an ultrasonic wave transmitted from the second transmission portion 36 is reflected by the medium 99 as indicated with the solid line in FIG. 2. In this case, an ultrasonic wave transmitted from the second transmission portion 36 is reflected by the front surface 99A of the medium 99. When the medium 99 is not positioned below the second transmission portion 36, an ultrasonic wave transmitted from the second transmission portion 36 is reflected by the first support portion 21 as indicated with the two-dot chain line in FIG. 2.

The second reception portion 37 is configured to receive an ultrasonic wave. The second reception portion 37 receives an ultrasonic wave transmitted from the second transmission portion 36. The second reception portion 37 receives that is transmitted from the second transmission portion 36 and is reflected by the medium 99 or the first support portion 21. Specifically, when the medium 99 is positioned below the second transmission portion 36, the second reception portion 37 receives an ultrasonic wave that is transmitted from the second transmission portion 36 and is reflected by the medium 99. In this case, the second reception portion 37 receives an ultrasonic wave reflected by the front surface 99A of the medium 99. When the medium 99 is not positioned below the second transmission portion 36, the second reception portion 37 receives an ultrasonic wave that is transmitted from the second transmission portion 36 and is reflected by the first support portion 21.

When the second reception portion 37 receives an ultrasonic wave that is transmitted from the second transmission portion 36 and is reflected by a target object, a distance between the second ultrasonic wave sensor 25 and the target object is detected. Specifically, a distance between the second ultrasonic wave sensor 25 and the target object is detected by detecting a time period from transmission of an ultrasonic wave from the second transmission portion 36 to reception of the ultrasonic wave by the second reception portion 37, that is, so-called time-of-flight. In the first exemplary embodiment, the second ultrasonic wave sensor 25 detects a vertical distance between the second ultrasonic wave sensor 25 and the target object.

When the second reception portion 37 receives an ultrasonic wave that is transmitted from the second transmission portion 36 and is reflected by the front surface 99A of the medium 99, a distance between the second ultrasonic wave sensor 25 and the front surface 99A of the medium 99 is detected. When the second reception portion 37 receives an ultrasonic wave that is transmitted from the second transmission portion 36 and is reflected by the first support portion 21, a distance between the second ultrasonic wave sensor 25 and the first support portion 21 is detected. Here, a distance between the second ultrasonic wave sensor 25 and the first support portion 21 can be regarded as a distance between the second ultrasonic wave sensor 25 and the back surface 99B of the medium 99.

Based on a distance between the second ultrasonic wave sensor 25 and the front surface 99A and a distance between the second ultrasonic wave sensor 25 and the back surface 99B, a thickness of the medium 99, which is equivalent to a distance between the front surface 99A and the back surface 99B, can be grasped. Specifically, based on an ultrasonic wave that is reflected by the front surface of the medium 99 and an ultrasonic wave that is reflected by the first support portion 21, a thickness of the medium 99 is detected. In this manner, the second ultrasonic wave sensor 25 is a sensor that detects a thickness of the medium 99. The first control unit 23 may calculate a thickness of the medium 99, based on a signal transmitted from the second ultrasonic wave sensor 25.

As illustrated in FIG. 1, the first optical sensor 26 is positioned upstream of the head 32 in the transport direction Y. The first optical sensor 26 faces the first support portion 21. The first optical sensor 26 is positioned above the first support portion 21. For example, the first optical sensor 26 is mounted to the carriage 33. The first optical sensor 26 of the first exemplary embodiment is mounted to a surface of the carriage 33, which faces upstream in the transport direction Y. The first optical sensor 26 is mounted to the carriage 33, and thus scans the medium 99 together with the carriage 33.

Figure 3:
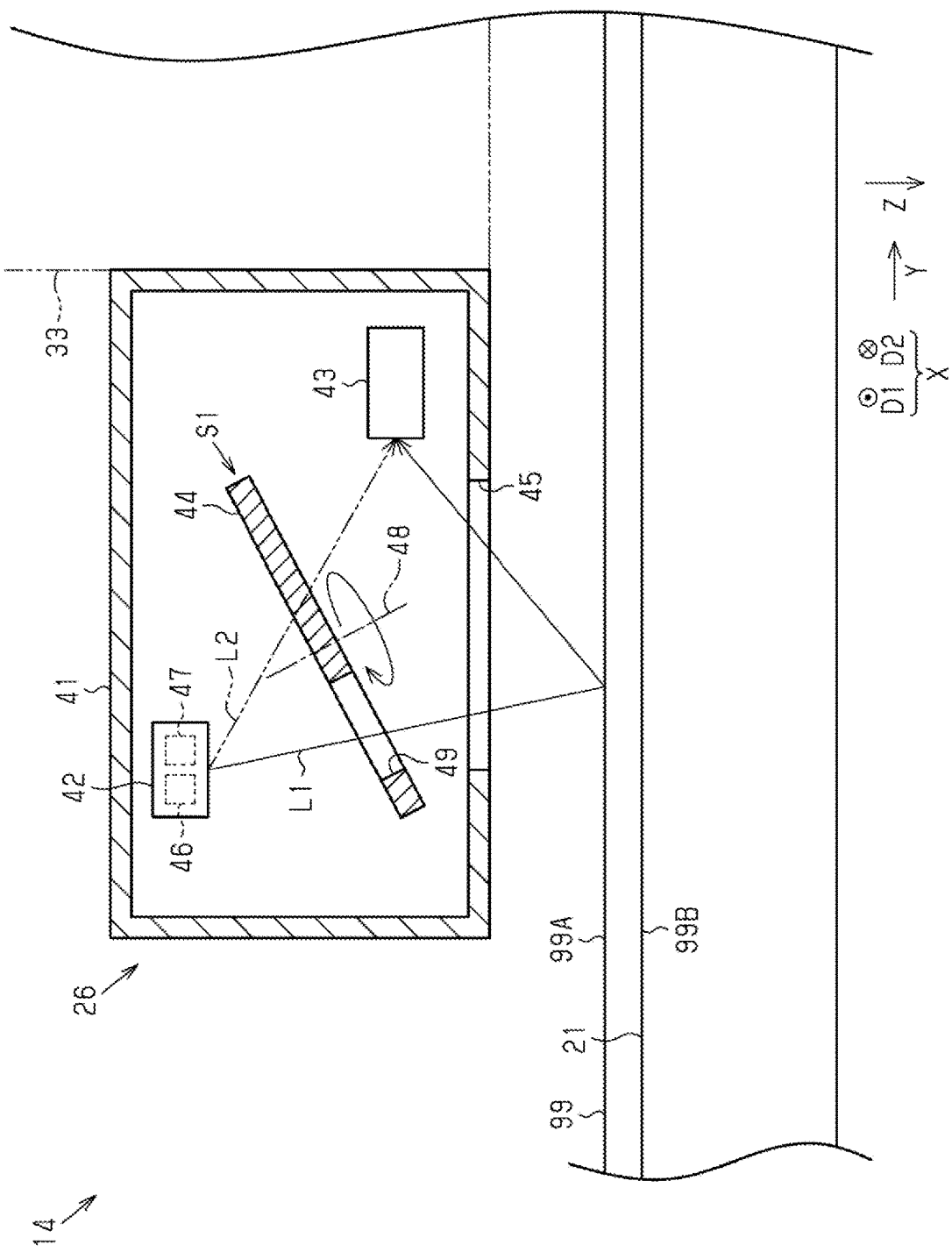
FIG. 3 is a cross-sectional view of a first optical sensor including a first light shielding portion in a first mode.
Figure 4:
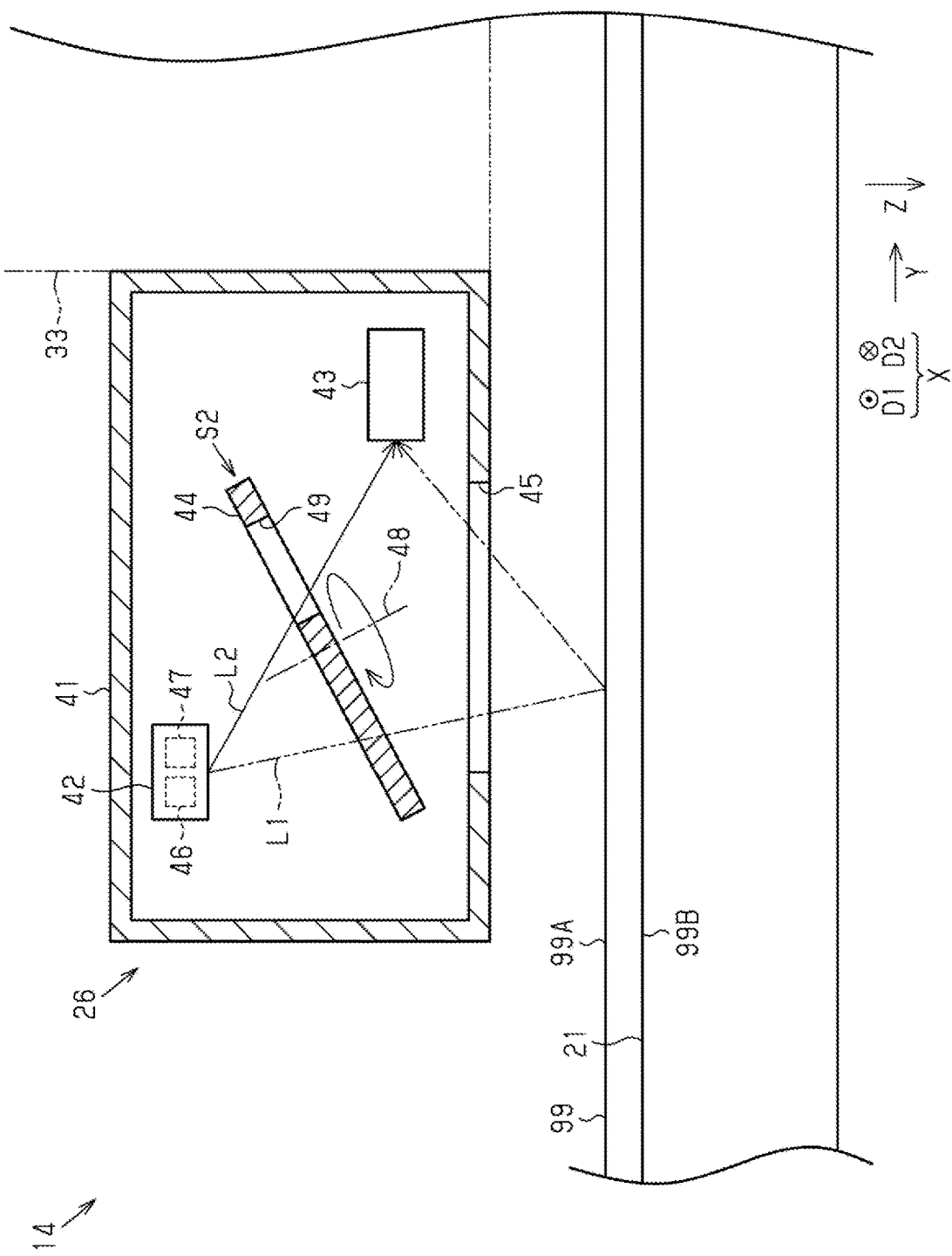
FIG. 4 is a cross-sectional view of the first optical sensor including the first light shielding portion in a second mode.

As illustrated in FIG. 3 and FIG. 4, the first optical sensor 26 includes a first case 41, a first light source 42, and a first light receiving portion 43. The first optical sensor 26 of the first exemplary embodiment further includes a first light shielding portion 44. The first optical sensor 26 is an optical sensor of a reflection type.

The first case 41 accommodates the first light source 42, the first light receiving portion 43, and the first light shielding portion 44. For example, a shape of the first case 41 is a rectangular parallelepiped shape or a rectangular parallelepiped-like shape. The first case 41 has a first opening 45. The first opening 45 is provided in a surface of the first case 41, which faces the first support portion 21. Specifically, in the first exemplary embodiment, the first opening 45 is provided in a lower surface of the first case 41. An inner part of the first case 41 and an outer part of the first case 41 communicate with each other through the first opening 45.

The first light source 42 is a light source that emits light. The first light source 42 emits light having a peak wavelength being an absorption wavelength of water. For example, the first light source 42 is configured to emit light having a peak wavelength from 900 nm to 2,100 nm. The first light source 42 of the first exemplary embodiment emits near infrared light.

The first light source 42 of the first exemplary embodiment radiates light downward. Thus, for example, the first light source 42 of the first exemplary embodiment radiates light on the medium 99 before being subjected to processing by the head 32. In this case, the first light source 42 radiates light on the front surface 99A of the medium 99.

The first light source 42 includes one or a plurality of light emitting elements that emit light. In the first exemplary embodiment, the first light source 42 includes a plurality of light emitting elements. Specifically, the first light source 42 includes a plurality of light emitting elements having different peak wavelengths. For example, the light emitting elements are LEDs. For example, the first light source 42 includes a first light emitting element 46 and a second light emitting element 47. The first light source 42 may include three or more light emitting elements.

For example, the first light emitting element 46 is a light emitting element that emits light having a peak wavelength of 940 nm. 940 nm is an absorption wavelength of water. For example, the second light emitting element 47 is a light emitting element that emits light having a peak wavelength of 1,450 nm. 1,450 nm is an absorption wavelength of water. Each of the first light emitting element 46 and the second light emitting element 47 is only required to be a light emitting element that emits light having a peak wavelength being an absorption wavelength of water. For example, the first light emitting element 46 may be a light emitting element that emits light having a peak wavelength of 1,800 nm, a light emitting element that emits light having a peak wavelength of 1,940 nm, or a light emitting element that emits light having a peak wavelength of 2,100 nm. Similarly, the second light emitting element 47 may be a light emitting element that emits light having a peak wavelength of 1,800 nm, a light emitting element that emits light having a peak wavelength of 1,940 nm, or a light emitting element that emits light having a peak wavelength of 2,100 nm. Any one of 1,800 nm, 1,940 nm, and 2,100 nm is an absorption wavelength of water.

A peak wavelength of light emitted from the first light emitting element 46 is lower than a peak wavelength of light emitted from the second light emitting element 47. In this respect, the first light emitting element 46 is one example of a short-wavelength light emitting element. The second light emitting element 47 is one example of a long-wavelength light emitting element.

The first light receiving portion 43 receives light emitted from the first light source 42. For example, the first light receiving portion 43 includes a light receiving element. For example, the light receiving element is a photodiode. The first light receiving portion 43 receives light advancing through a first detection optical path L1 or from the first light source 42 or light advancing through a first reference optical path L2 from the first light source 42. Specifically, light emitted from the first light source 42 advances through the first detection optical path L1 or the first reference optical path L2, and thus enters the first light receiving portion 43.

The first detection optical path L1 is an optical path through which light emitted from the first light source 42 enters the first light receiving portion 43 by being reflected by the medium 99 the first support portion 21. The first detection optical path L1 is an optical path indicated with the solid line in FIG. 3 and with the two-dot chain line in FIG. 4. The first detection optical path L1 extends from the inner part of the first case 41 to the outer part of the first case 41 through the first opening 45. The first detection optical path L1 extends from the first light source 42 to the medium 99 supported by the first support portion 21, and then extends from the medium 99 to the first light receiving portion 43.

First, light advancing through the first detection optical path L1 passes through the first opening 45 from the first light source 42, and abuts on the medium 99. In this case, light advancing through the first detection optical path L1 abuts on the front surface 99A of the medium 99. The light that abuts on the front surface 99A of the medium 99 is reflected by the front surface 99A of the medium 99. The light reflected by the front surface 99A of the medium 99 passes through the first opening 45, and then enters the first light receiving portion 43. In this manner, the light emitted from the first light source 42 advances through the first detection optical path L1. As a result, the first light receiving portion 43 receives light reflected by the medium 99.

The first reference optical path L2 is an optical path through which light emitted from the first light source 42 enters the first light receiving portion 43 without being reflected by the medium 99 supported by the first support portion 21. The first reference optical path L2 is an optical path indicated with the two-dot chain line in FIG. 3 and with the solid line in FIG. 4. The first reference optical path L2 extends in the inner part of the first case 41. The first reference optical path L2 extends straight from the first light source 42 to the first light receiving portion 43 in the inner part of the first case 41. Thus, light advancing through the first reference optical path L2 directly enters the first light receiving portion 43 from the first light source 42. With this, the first light receiving portion 43 receives light emitted from the first light source 42.

The first light shielding portion 44 is configured to block light emitted from the first light source 42. For example, a shape of the first light shielding portion 44 is a plate shape or a plate-like shape. The first light shielding portion 44 is positioned between the first light source 42 and the first light receiving portion 43 in the inner part of the first case 41. For example, the first light shielding portion 44 is positioned to be across the first detection optical path L1 and the first reference optical path L2. The first light shielding portion 44 closes the first detection optical path L1 or the first reference optical path L2. The first light shielding portion 44 closes the first detection optical path L1 or the first reference optical path L2, and thus blocks light emitted from the first light source 42.

The first light shielding portion 44 is configured to be switched between a first state S1 and a second state S2. The first light shielding portion 44 illustrated in FIG. 3 is in the first state S1. The first light shielding portion 44 illustrated in FIG. 4 is in the second state S2.

For example, the first light shielding portion 44 is displaced, and thus is switched between the first state S1 and the second state S2. The first light shielding portion 44 of the first exemplary embodiment is configured to be rotated about a first rotary axis 48 being a virtual axis. The first light shielding portion 44 of the first exemplary embodiment is rotated about the first rotary axis 48, and thus is switched between the first state S1 and the second state S2. For example, the first light shielding portion 44 is supported by the first case 41 under a state of being rotatable about the first rotary axis 48.

For example, the first light shielding portion 44 has a first hole 49. When the first light shielding portion 44 is in the first state S1, the first hole 49 is positioned on the first detection optical path L1. Thus, when the first light shielding portion 44 is in the first state S1, light advancing through the first detection optical path L1 from the first light source 42 passes through the first hole 49, and then enters the first light receiving portion 43. Specifically, in the first state S1, the first light shielding portion 44 allows light emitted from the first light source 42 to advance through the first detection optical path L1. Further, when the first light shielding portion 44 is in the first state S1, the first hole 49 is not positioned on the first reference optical path L2. Specifically, in the first state S1, the first light shielding portion 44 does not allow light emitted from the first light source 42 to advance through the first reference optical path L2. In this manner, the first state S1 of the first light shielding portion 44 is a state in which the first light shielding portion 44 does not shield the first detection optical path L1 but the first light shielding portion 44 shields the first reference optical path L2.

When the first light shielding portion 44 is in the second state S2, the first hole 49 is positioned on the first reference optical path L2. Thus, when the first light shielding portion 44 is in the second state S2, light advancing through the first reference optical path L2 from the first light source 42 passes through the first hole 49, and then enters the first light receiving portion 43. Specifically, in the second state S2, the first light shielding portion 44 allows light emitted from the first light source 42 to advance through the first reference optical path L2. Further, when the first light shielding portion 44 is in the second state S2, the first hole 49 is not positioned on the first detection optical path L1. Specifically, in the second state S2, the first light shielding portion 44 does not allow light emitted from the first light source 42 to advance through the first detection optical path L1. In this manner, the second state S2 of the first light shielding portion 44 is a state in which the first light shielding portion 44 shields the first detection optical path L1 and the first light shielding portion 44 does not shield the first reference optical path L2.

The first light shielding portion 44 is switched between the first state S1 and the second state S2, and thus an optical path through which light emitted from the first light source 42 advances is determined. In the first exemplary embodiment, the first control unit 23 switches the first light shielding portion 44 between the first state S1 and the second state S2.

When the first light source 42 irradiates the medium 99 with light, that is, light advancing through the first detection optical path L1 abuts on the medium 99, part of light is absorbed in the medium 99. Particularly, near infrared light emitted from the first light source 42 is likely to be absorbed in water. Thus, when an amount of moisture contained in the medium 99 is larger, more light is absorbed in the medium 99. In contrast, when an amount of moisture contained in the medium 99 is small, less light is absorbed in the medium 99.

When the first light receiving portion 43 receives light advancing through the first detection optical path L1, intensity of light reflected by the medium 99 is detected. When the first light receiving portion 43 receives light advancing through the first reference optical path L2, intensity of light radiated by the first light source 42 on the medium 99 is detected. Based on intensity of light advancing through the first detection optical path L1 and intensity of light advancing through the first reference optical path L2, reflectance of light with respect to the medium 99 is detected. Here, reflectance of light with respect to the medium 99 is a ratio of light reflected by the medium 99 with respect to light radiated on the medium 99.

Reflectance of light with respect to the medium 99 and an amount of moisture contained in the medium 99 are interrelated. For example, as reflectance of light with respect to the medium 99 is higher, an amount of moisture contained in the medium 99 is smaller. As reflectance of light with respect to the medium 99 is lower, an amount of moisture contained in the medium 99 is larger. In this manner, based on reflectance of light with respect to the medium 99, an amount of moisture contained in the medium 99 is detected. Therefore, the first optical sensor 26 is a sensor that detects an amount of moisture contained in the medium 99 before printing, that is, before processing. The first optical sensor 26 can particularly detect an amount of moisture of the front surface 99A at high accuracy. The first control unit 23 may calculate an amount of moisture contained in the medium 99, based on a signal transmitted from the first optical sensor 26.

As illustrated in FIG. 1, the second optical sensor 27 is positioned downstream of the head 32 in the transport direction Y. The second optical sensor 27 faces the first support portion 21. The second optical sensor 27 is positioned above the first support portion 21. For example, the second optical sensor 27 is mounted to the carriage 33. The second optical sensor 27 of the first exemplary embodiment is mounted to a surface of the carriage 33, which faces downstream in the transport direction Y. The second optical sensor 27 is mounted to the carriage 33, and thus scans the medium 99 together with the carriage 33. In the first exemplary embodiment, the configuration of the second optical sensor 27 is the same as the first optical sensor 26.

Figure 5:
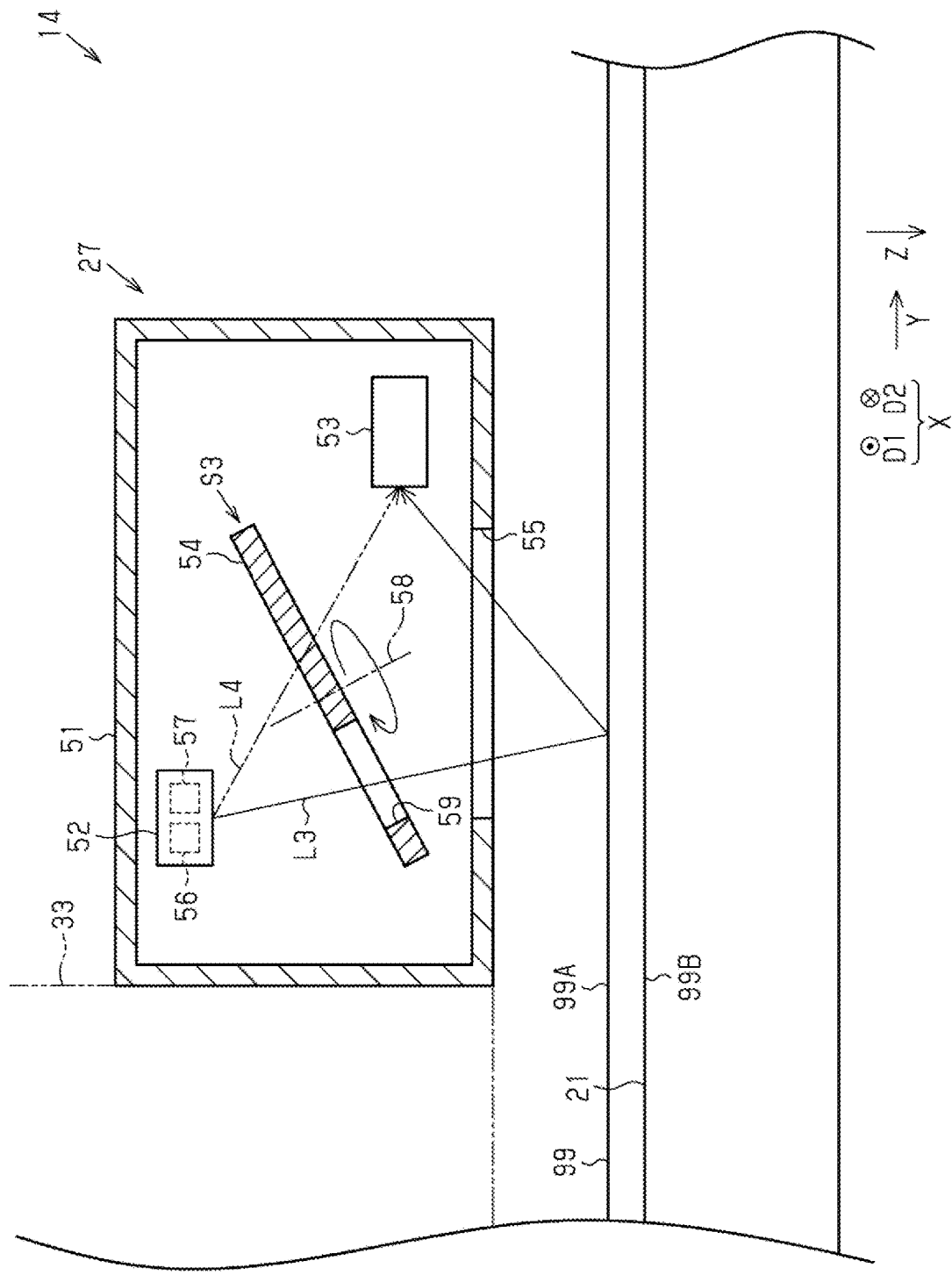
FIG. 5 is a cross-sectional view of a second optical sensor including a second light shielding portion in a third mode.
Figure 6:
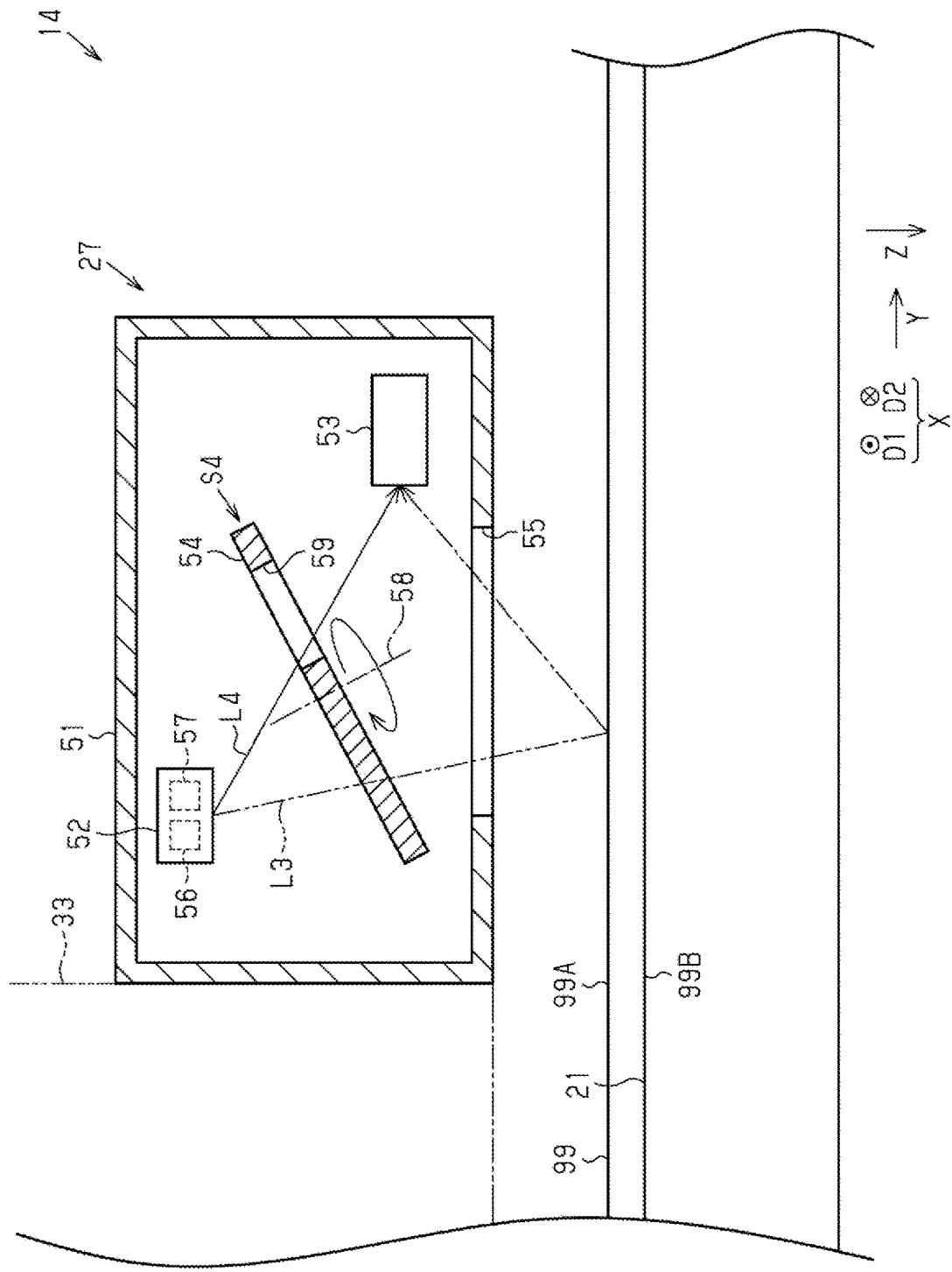
FIG. 6 is a cross-sectional view of the second optical sensor including the second light shielding portion in a fourth mode.

As illustrated in FIG. 5 and FIG. 6, the second optical sensor 27 includes a second case 51, a second light source 52, and a second light receiving portion 53. The second optical sensor 27 of the first exemplary embodiment further includes a second light shielding portion 54. The second optical sensor 27 is an optical sensor of a reflection type.

The second case 51 accommodates the second light source 52, the second light receiving portion 53, and the second light shielding portion 54. For example, a shape of the second case 51 is a rectangular parallelepiped shape or a rectangular parallelepiped-like shape. The second case 51 has a second opening 55. The second opening 55 is provided in a surface of the second case 51, which faces the first support portion 21. Specifically, in the first exemplary embodiment, the second opening 55 is provided in a lower surface of the second case 51. An inner part of the second case 51 and an outer part of the second case 51 communicate with each other through the second opening 55.

The second light source 52 is a light source that emits light. The second light source 52 emits light having a peak wavelength being an absorption wavelength of water. For example, the second light source 52 is configured to emit light having a peak wavelength from 900 nm to 2,100 nm. The second light source 52 of the first exemplary embodiment emits near infrared light.

The second light source 52 of the first exemplary embodiment radiates light downward. Thus, for example, the second light source 52 of the first exemplary embodiment radiates light on the medium 99 after being subjected to processing by the head 32. In this case, the second light source 52 radiates light on the front surface 99A of the medium 99.

The second light source 52 includes one or a plurality of light emitting elements that emit light. In the first exemplary embodiment, the second light source 52 includes a plurality of light emitting elements. Specifically, the second light source 52 includes a plurality of light emitting elements having different peak wavelengths. For example, the second light source 52 includes a third light emitting element 56 and a fourth light emitting element 57. The second light source 52 may include three or more light emitting elements.

For example, the third light emitting element 56 is a light emitting element that emits light having a peak wavelength of 940 nm. For example, the fourth light emitting element 57 is a light emitting element that emits light having a peak wavelength of 1,450 nm. Each of the third light emitting element 56 and the fourth light emitting element 57 is only required to be a light emitting element that emits light having a peak wavelength being an absorption wavelength of water. For example, the third light emitting element 56 may be a light emitting element that emits light having a peak wavelength of 1,800 nm, a light emitting element that emits light having a peak wavelength of 1,940 nm, or a light emitting element that emits light having a peak wavelength of 2,100 nm. Similarly, the fourth light emitting element 57 may be a light emitting element that emits light having a peak wavelength of 1,800 nm, a light emitting element that emits light having a peak wavelength of 1,940 nm, or a light emitting element that emits light having a peak wavelength of 2,100 nm.

A peak wavelength of light emitted from the third light emitting element 56 is lower than a peak wavelength of light emitted from the fourth light emitting element 57. In this respect, the third light emitting element 56 is one example of a short-wavelength light emitting element. The fourth light emitting element 57 is one example of a long-wavelength light emitting element.

The second light receiving portion 53 receives light emitted from the second light source 52. For example, the second light receiving portion 53 includes a light receiving element. The second light receiving portion 53 receives light advancing through a second detection optical path L3 from the second light source 52 or light advancing through a second reference optical path L4 from the second light source 52. Specifically, light emitted from the second light source 52 advances through the second detection optical path L3 or the second reference optical path L4, and thus enters the second light receiving portion 53.

The second detection optical path L3 is an optical path through which light emitted from the second light source 52 enters the second light receiving portion 53 by being reflected by the medium 99 supported by the first support portion 21. The second detection optical path L3 is an optical path indicated with the solid line in FIG. 5 and with the two-dot chain line in FIG. 6. The second detection optical path L3 extends from the inner part of the second case 51 to the outer part of the second case 51 through the second opening 55. The second detection optical path L3 extends from the second light source 52 to the medium 99 supported by the first support portion 21, and then extends from the medium 99 to the second light receiving portion 53.

First, light advancing through the second detection optical path L3 passes through the second opening 55 form the second light source 52, and abuts on the medium 99. In this case, light advancing through the second detection optical path L3 abuts on the front surface 99A of the medium 99. The light that abuts on the front surface 99A of the medium 99 is reflected by the front surface 99A of the medium 99. The light reflected by the front surface 99A of the medium 99 passes through the second opening 55, and then enters the second light receiving portion 53. In this manner, the light emitted from the second light source 52 advances through the second detection optical path L3. As a result, the second light receiving portion 53 receives light reflected by the medium 99.

The second reference optical path L4 is an optical path through which light emitted from the second light source 52 enters the second light receiving portion 53 without being reflected by the medium 99 supported by the first support portion 21. The second reference optical path L4 is an optical path indicated with the two-dot chain line in FIG. 5 and with the solid line in FIG. 6. The second reference optical path L4 extends in the inner part of the second case 51. The second reference optical path L4 extends straight from the second light source 52 to the second light receiving portion 53 in the inner part of the second case 51. Thus, light advancing through the second reference optical path L4 directly enters the second light receiving portion 53 from the second light source 52. With this, the second light receiving portion 53 directly receives light emitted from light emitted from the second light source 52.

The second light shielding portion 54 is configured to block light emitted from the second light source 52. For example, a shape of the second light shielding portion 54 is a plate shape or a plate-like shape. The second light shielding portion 54 is positioned between the second light source 52 and the second light receiving portion 53 in the inner part of the second case 51. For example, the second light shielding portion 54 is positioned to be across the second detection optical path L3 and the second reference optical path L4. The second light shielding portion 54 closes the second detection optical path L3 or the second reference optical path L4. The second light shielding portion 54 closes the second detection optical path L3 or the second reference optical path L4, and thus blocks light emitted from the second light source 52.

The second light shielding portion 54 is configured to be switched between a third state S3 and a fourth state S4. The second light shielding portion 54 illustrated in FIG. 5 is in the third state S3. The second light shielding portion 54 illustrated in FIG. 6 is in the fourth state S4.

For example, the second light shielding portion 54 is displaced, and thus is switched between the third state S3 and the fourth state S4. The second light shielding portion 54 of the first exemplary embodiment is configured to be rotated about a second rotary axis 58 being a virtual axis. The second light shielding portion 54 of the first exemplary embodiment is rotated about the second rotary axis 58, and thus is switched between the third state S3 and the fourth state S4. For example, the second light shielding portion 54 is supported by the second case 51 under a state of being rotatable about the second rotary axis 58.

For example, the second light shielding portion 54 has a second hole 59. When the second light shielding portion 54 is in the third state S3, the second hole 59 is positioned on the second detection optical path L3. Thus, when the second light shielding portion 54 is in the third state S3, light advancing through the second detection optical path L3 from the second light source 52 passes through the second hole 59, and then enters the second light receiving portion 53. Specifically, in the third state S3, the second light shielding portion 54 allows light emitted from the second light source 52 to advance through the second detection optical path L3. Further, when the second light shielding portion 54 is in the third state S3, the second hole 59 is not positioned on the second reference optical path L4. Specifically, in the third state S3, the second light shielding portion 54 does not allow light emitted from the second light source 52 to advance through the second reference optical path L4. In this manner, the third state S3 of the second light shielding portion 54 is a state in which the second light shielding portion 54 does not shield the second detection optical path L3 but the second light shielding portion 54 shields the second reference optical path L4.

When the second light shielding portion 54 is in the fourth state S4, the second hole 59 is positioned on the second reference optical path L4. Thus, when the second light shielding portion 54 is in the fourth state S4, light advancing through the second reference optical path L4 from the second light source 52 passes through the second hole 59, and then enters the second light receiving portion 53. Specifically, in the fourth state S4, the second light shielding portion 54 allows light emitted from the second light source 52 to advance through the second reference optical path L4. Further, when the second light shielding portion 54 is in the fourth state S4, the second hole 59 is not positioned on the second detection optical path L3. Specifically, in the fourth state S4, the second light shielding portion 54 does not allow light emitted from the second light source 52 to pass through the second detection optical path L3. In this manner, the fourth state S4 of the second light shielding portion 54 is a state in which the second light shielding portion 54 shields the second detection optical path L3 and the second light shielding portion 54 does not shield the second reference optical path L4.

The second light shielding portion 54 is switched between the third state S3 and the fourth state S4, and thus an optical path through which light emitted from the second light source 52 advances is determined. In the first exemplary embodiment, the first control unit 23 switches the second light shielding portion 54 between the third state S3 and the fourth state S4.

When the second light receiving portion 53 receives light advancing through the second detection optical path L3, and intensity of light reflected by the medium 99 is detected. When the second light receiving portion 53 receives light advancing through the second reference optical path L4, intensity of light radiated by the second light source 52 on the medium 99 is detected. Based on intensity of light advancing through the second detection optical path L3 and intensity of light advancing through the second reference optical path L4, reflectance of light with respect to the medium 99 is detected. Specifically, similarly to the first optical sensor 26, an amount of moisture contained in the medium 99 is detected based on reflectance of light with respect to the medium 99. Therefore, the second optical sensor 27 is a sensor that detects an amount of moisture contained in the medium 99 after printing, that is, after processing. The second optical sensor 27 can particularly detect an amount of moisture of the front surface 99A at high accuracy. The first control unit 23 may calculate an amount of moisture contained in the medium 99, based on a signal transmitted from the second optical sensor 27.

Based on a detection result of the first optical sensor 26 and a detection result of the second optical sensor 27, change in amount of moisture contained in the medium 99 with respect to processing to which the medium 99 is subjected by the processing portion is detected. Specifically, in the first exemplary embodiment, increase in amount of moisture contained in the medium 99 with respect to the liquid, which is ejected from the head 32 onto the medium 99, is detected. The first control unit 23 may calculate increase in amount of moisture contained in the medium 99 with respect to processing, based on a detection result of the first optical sensor 26 and a detection result of the second optical sensor 27. Change in amount of moisture contained in the medium 99 with respect to processing to which the medium 99 is subjected by the processing portion is effective in grasping characteristics of the medium 99.

As illustrated in FIG. 1, for example, the electrostatic capacitance sensor 28 is mounted to the first support portion 21. The electrostatic capacitance sensor 28 of the first exemplary embodiment is mounted to the mounting hole 31. For example, the electrostatic capacitance sensor 28 is positioned between the first optical sensor 26 and the second optical sensor 27 in the transport direction Y. The electrostatic capacitance sensor 28 of the first exemplary embodiment is positioned downstream of the head 32 in the transport direction Y.

Figure 7:
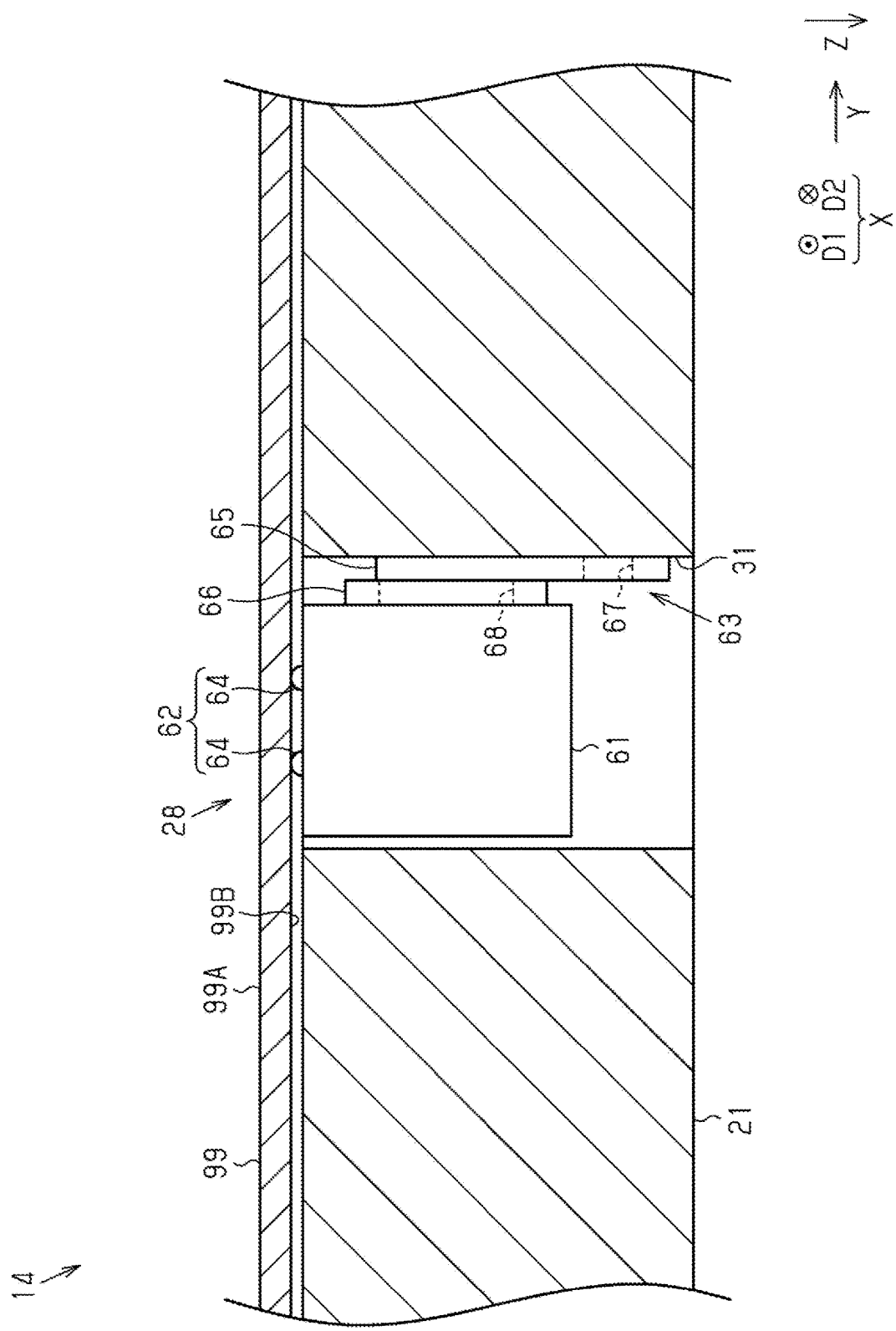
FIG. 7 is a cross-sectional view an electrostatic capacitance sensor.

As illustrated in FIG. 7, the electrostatic capacitance sensor 28 is positioned to be accommodated in the mounting hole 31. The electrostatic capacitance sensor 28 is positioned below the medium 99 supported by the first support portion 21. The electrostatic capacitance sensor 28 is brought into contact with the medium 99 from below. The electrostatic capacitance sensor 28 is brought into contact with the medium 99, and thus detects electrostatic capacitance of the medium 99. The electrostatic capacitance sensor 28 of the first exemplary embodiment detects electrostatic capacitance of the medium 99 after printing, that is, after being subjected to processing.

The electrostatic capacitance sensor 28 includes a retaining portion 61, an electrode pair 62, and a position adjusting portion 63. The retaining portion 61 retains the electrode pair 62. For example, a shape of the retaining portion 61 is a rectangular parallelepiped shape or a rectangular parallelepiped-like shape. The retaining portion 61 is mounted to the position adjusting portion 63.

The electrode pair 62 is provided to protrude from the retaining portion 61. The electrode pair 62 of the first exemplary embodiment protrudes from an upper surface of the retaining portion 61. The electrode pair 62 is brought into contact with the medium 99 supported by the first support portion 21. In the first exemplary embodiment, the electrode pair 62 is brought into contact with the back surface 99B of the medium 99. In this case, as compared to a case where the electrode pair 62 is brought into contact with the front surface 99A of the medium 99, a risk of damaging the front surface 99A to be subjected to printing, that is, the front surface 99A to be subjected to processing is reduced.

The electrode pair 62 constitutes part of an oscillation circuit included in the electrostatic capacitance sensor 28. The electrode pair 62 is constituted of two electrodes 64. An AC voltage is applied between the two electrodes 64. Specifically, the electrostatic capacitance sensor 28 detects electrostatic capacitance between the two electrodes 64. When the two electrodes 64 are brought into contact with the medium 99, an alternating current flows to the medium 99. With this, the electrostatic capacitance sensor 28 detects electrostatic capacitance of the medium 99 with which the electrode pair 62 is brought into contact.

When an alternating current flows from the two electrodes 64 to the medium 99, electrostatic capacitance between the two electrodes 64 is changed. In this case, change in electrostatic capacitance between the two electrodes 64 is greatly affected by an amount of moisture contained in the medium 99 with which the two electrodes 64 is brought into contact. The reason is because water has permittivity higher than that of the medium 99 such as paper and fabric. Thus, for example, when an amount of moisture contained in the medium 99 is large, change in electrostatic capacitance between the two electrodes 64 is large. When an amount of moisture contained in the medium 99 is small, change in electrostatic capacitance between the two electrodes 64 is small. In this manner, change in electrostatic capacitance between the two electrodes 64 and an amount of moisture contained in the medium 99 are inter-related. Therefore, based on change in electrostatic capacitance between the two electrodes 64, an amount of moisture contained in the medium 99 is detected. The first control unit 23 may calculate an amount of moisture contained in the medium 99, based on a signal transmitted from the electrostatic capacitance sensor 28.

Change in electrostatic capacitance between the two electrodes 64 is affected by a basis weight of the medium 99 with which the two electrodes 64 is brought into contact. For example, when a basis weight of the medium 99 is large, change in electrostatic capacitance between the two electrodes 64 is large. When a basis weight of the medium 99 is small, change in electrostatic capacitance between the two electrodes 64 is small. Thus, in the first exemplary embodiment, with the first ultrasonic wave sensor 24 and the electrostatic capacitance sensor 28, an amount of moisture contained in the medium 99 is detected at high accuracy. Particularly, based on a specific weight of the medium 99, a thickness of the medium 99, and change in electrostatic capacitance between the two electrodes 64, an amount of moisture contained in the medium 99 can be detected at high accuracy.

The first optical sensor 26 and the second optical sensor 27 mainly detect an amount of moisture contained in the front surface 99A of the medium 99. Meanwhile, the electrostatic capacitance sensor 28 mainly detects an amount of moisture contained in the back surface 99B of the medium 99 and in an inner part of the medium 99. Thus, with the first optical sensor 26, the second optical sensor 27, and the electrostatic capacitance sensor 28, an amount of moisture contained in the medium 99 is detected at high accuracy.

When the head 32 ejects the liquid onto the medium 99, most part of the liquid is left on the front surface 99A of the medium 99 in some cases. In this case, with reference to a detection result of the first optical sensor 26 and a detection result of the second optical sensor 27, it can be grasped that increase in amount of moisture contained in the medium 99 is large with respect to an amount of the liquid ejected from the head 32. Meanwhile, with reference to a detection result of the first optical sensor 26 and a detection result of the electrostatic capacitance sensor 28, the liquid is not really absorbed in the medium 99. Thus, it can be grasped that increase in amount of moisture contained in the medium 99 is small with respect to an amount of the liquid ejected from the head 32. Based on the matters described above, it can be grasped that the medium 99 has characteristics of being less likely to absorb the liquid. In this manner, based on a detection result of the first optical sensor 26, a detection result of the second optical sensor 27, and a detection result of the electrostatic capacitance sensor 28, characteristics of the medium 99 can be grasped.

The position adjusting portion 63 includes a first adjustment member 65 and a second adjustment member 66. In the first exemplary embodiment, the first adjustment member 65 and the second adjustment member 66 are positioned downstream of the retaining portion 61 in the transport direction Y, but may be positioned upstream of the retaining portion 61 in the transport direction Y.

For example, the first adjustment member 65 is a plate or plate-like member. The first adjustment member 65 is mounted to the first support portion 21 and the second adjustment member 66. The first adjustment member 65 is mounted to the first support portion 21 on an inner circumferential surface of the mounting hole 31.

The first adjustment member 65 has a first elongated hole 67 extending in the scanning direction X. The first adjustment member 65 is screwed to the first support portion 21 through the first elongated hole 67, and thus is fixed to the first support portion 21. Specifically, the first adjustment member 65 is movable in the scanning direction X with respect to the first support portion 21. In this manner, a position of the first adjustment member 65 is adjustable in the scanning direction X with respect to the first support portion 21.

For example, the second adjustment member 66 is a plate or plate-like member. The second adjustment member 66 is mounted to the first adjustment member 65 and the retaining portion 61. The second adjustment member 66 is positioned between the first adjustment member 65 and the retaining portion 61. The second adjustment member 66 is fixed to the retaining portion 61.

The second adjustment member 66 has a second elongated hole 68 extending in the vertical direction Z. The second adjustment member 66 is screwed to the first adjustment member 65 through the second elongated hole 68, and thus is fixed to the first adjustment member 65. Specifically, the second adjustment member 66 is movable in the vertical direction Z with respect to the first adjustment member 65. In this manner, a position of the second adjustment member 66 is adjustable in the vertical direction Z with respect to the first adjustment member 65.

When the first adjustment member 65 moves in the scanning direction X with respect to the first support portion 21, the electrode pair 62 moves in the scanning direction X with respect to the first support portion 21. When the second adjustment member 66 moves in the vertical direction Z with respect to the first adjustment member 65, the electrode pair 62 moves the vertical direction Z with respect to the first support portion 21. In this manner, a position of the electrostatic capacitance sensor 28 is adjustable with the position adjusting portion 63 in the scanning direction X and the vertical direction Z. With this, a position of the electrode pair 62 can be adjusted in such a way that the electrode pair 62 is effectively brought into contact with the medium 99.

As illustrated in FIG. 1, the drying device 15 is positioned downstream of the printing device 14 in the transport direction Y. The drying device 15 is a device that dries the medium 99. The drying device 15 dries the medium 99 subjected to printing by the printing device 14. The drying device 15 is one example of a processing device. Specifically, the drying device 15 dries the medium 99, and thus subjects the medium 99 to processing. In the printing system 11, the medium 99 is subjected to processing by the printing device 14 and the drying device 15 in the stated order.

The drying device 15 of the first exemplary embodiment includes a second support portion 71, an accommodation body 72, heating portions 73, and a second control unit 74.

For example, the second support portion 71 is a plate-like member. The second support portion 71 supports the transported medium 99. The second support portion 71 supports the medium 99 subjected to printing by the printing device 14. The second support portion 71 of the first exemplary embodiment supports the medium 99 from below. The second support portion 71 of the first exemplary embodiment is brought into contact with the back surface 99B of the medium 99. The second support portion 71 is a support portion included in the drying device 15 in the printing system 11.

The accommodation body 72 faces the second support portion 71. The accommodation body 72 of the first exemplary embodiment is positioned above the second support portion 71. For example, the accommodation body 72 is a box. The accommodation body 72 has an opening 75 in a surface facing the second support portion 71. Thus, the opening 75 is oriented downward in the accommodation body 72. The accommodation body 72 accommodates the heating portions 73.

The heating portions 73 face the second support portion 71. The heating portions 73 of the first exemplary embodiment are positioned above the second support portion 71. The heating portions 73 are configured to heat the medium 99. For example, the heating portions 73 are heater tubes extending in the scanning direction X. In the first exemplary embodiment, the two heating portions 73 are provided. The two heating portions 73 are arrayed at an interval in the transport direction Y.

The heating portions 73 generate heat. The generated heat propagates to the second support portion 71 through the opening 75. With this, the heating portions 73 heat the medium 99 supported by the second support portion 71. In this case, the heating portions 73 heat the front surface 99A of the medium 99. The heating portions 73 heat the medium 99, and thus dries the liquid ejected onto the medium 99. As a result, the medium 99 is dried.

When the heating portions 73 heat the medium 99, an amount of moisture contained in the medium 99 is reduced. Specifically, when the heating portions 73 heat the medium 99, the medium 99 is subjected to processing of reducing an amount of moisture contained in the medium 99. The heating portions 73 subjects the front surface 99A of the medium 99 to processing, which is opposite to the back surface 99B with which the second support portion 71 is brought into contact. In this respect, each of the heating portions 73 of the first exemplary embodiment is one example of a processing portion.

The second control unit 74 controls the various configurations of the drying device 15. For example, the second control unit 74 controls the heating portions 73. The second control unit 74 is a control unit included in the drying device 15 in the printing system 11.

The second control unit 74 of the first exemplary embodiment is communicable with the retaining device 12, the winding device 13, and the printing device 14. As required, the second control unit 74 receives a signal from the retaining device 12, the winding device 13, and the printing device 14, and transmits a signal to the retaining device 12, the winding device 13, and the printing device 14. For example, the second control unit 74 and the first control unit 23 are mutually communicated with each other. The second control unit 74 may integrally control the printing system 11.

Similarly to the first control unit 23, the second control unit 74 may be configured as α: one or more processors that executes various processing in accordance with computer programs, β: one or more special purpose hardware circuit such as a special purpose integrated circuit, which executes at least part of processing of the various processing, or γ: a circuit including a combination of those. The processor includes a CPU and a memory such as a RAM and a ROM, and the memory stores program codes or commands configured to cause the CPU to execute processing. The memory, or a computer readable medium includes any readable medium accessible by a general purpose or special purpose computer.

Next, the functions and effects of the first exemplary embodiment are described.

(1) The first light source 42 and the first light receiving portion 43 detects an amount of moisture contained in the medium 99 before being subjected to processing. The second light source 52 and the second light receiving portion 53 detects an amount of moisture contained in the medium 99 after being subjected to processing. With this, decrease in amount of moisture contained in the medium 99 with respect to processing or increase in amount of moisture contained in the medium 99 with respect to processing can be detected. Therefore, change in amount of moisture contained in the medium 99 with respect to processing can be detected.

(2) At least one of the first light source 42 and the second light source 52 includes a plurality of light emitting elements that emit light having different peak wavelengths. In this case, light having different spectra is radiated on the medium 99. With this, an amount of moisture contained in the medium 99 can be detected at high accuracy.

(3) At least one of the first light source 42 and the second light source 52 includes a short-wavelength light emitting element that emits light having a peak wavelength of 940 nm and a long-wavelength light emitting element that emits light having a peak wavelength of 1,450 nm. 940 nm and 1,450 nm are absorption wavelengths of water. Thus, light emitted from a short-wavelength light emitting element and a long-wavelength light emitting element is likely to be absorbed in water. Therefore, according to this, an amount of moisture contained in the medium 99 can be detected at high accuracy.

(4) The first light shielding portion 44 is configured to be switched between the first state S1 of not shielding the first detection optical path L1 but shielding the first reference optical path L2, and the second state S2 of shielding the first detection optical path L1 and not shielding the first reference optical path L2. According to this, when the first light shielding portion 44 is in the first state S1, light emitted from the first light source 42 advances through the first detection optical path L1, and then enters the first light receiving portion 43. When the first light shielding portion 44 is in the second state S2, light emitted from the first light source 42 advances through the first reference optical path L2, and then enters the first light receiving portion 43. Based on light advancing through the first detection optical path L1 and light advancing through the first reference optical path L2, reflectance of light with respect to the medium 99 is detected at high accuracy. With this, for example, even when the first light source 42 is degraded over time, an amount of moisture contained in the medium 99 can be detected at high accuracy.

(5) The second light shielding portion 54 is configured to be switched between the third state S3 of not shielding the second detection optical path L3 but shielding the second reference optical path L4, and the fourth state S4 of shielding the second detection optical path L3 and not shielding the second reference optical path L4. According to this, when the second light shielding portion 54 is in the third state S3, light emitted from the second light source 52 advances through the second detection optical path L3, and then enters the second light receiving portion 53. When the second light shielding portion 54 is in the fourth state S4, light emitted from the second light source 52 advances through the second reference optical path L4, and then enters the second light receiving portion 53. Based on light advancing through the second detection optical path L3 and light advancing through the second reference optical path L4, reflectance of light with respect to the medium 99 is detected at high accuracy. With this, for example, even when the second light source 52 is degraded over time, an amount of moisture contained in the medium 99 can be detected at high accuracy.

(6) The head 32 being a processing portion subjects the front surface 99A of the medium 99 to processing, which is opposite to the back surface 99B with which the first support portion 21 is brought into contact. Meanwhile, the first light source 42 and the second light source 52 irradiates the front surface 99A with light. According to this, an amount of moisture contained in the front surface 99A of the medium 99 to be subjected to processing can be detected at high accuracy.

(7) The printing device 14 being a processing device includes the electrostatic capacitance sensor 28 and the first ultrasonic wave sensor 24. The first transmission portion 34 and the first reception portion 35 included in the first ultrasonic wave sensor 24 are positioned to sandwich the transported medium 99. According to this, when the medium 99 is between the first transmission portion 34 and the first reception portion 35, an ultrasonic wave transmitted from the first transmission portion 34 passes through the medium 99. In this case, the first reception portion 35 receives an ultrasonic wave passing through the medium 99. When the medium 99 is not present between the first transmission portion 34 and the first reception portion 35, the first reception portion 35 receives an ultrasonic wave transmitted from the first transmission portion 34 as it is. Based on an ultrasonic wave that does not pass through the medium 99 and an ultrasonic wave that passes through the medium 99, transmittance of an ultrasonic wave with respect to the medium 99 is detected. Further, based on transmittance of an ultrasonic wave with respect to the medium 99, a basis weight of the medium 99 is detected. Thus, based on electrostatic capacitance of the medium 99, which is detected by the electrostatic capacitance sensor 28, and a basis weight of the medium 99, which is detected by the first ultrasonic wave sensor 24, an amount of moisture contained in the medium 99 can be detected. With this, an amount of moisture contained in the medium 99 can be detected at high accuracy.

(8) The first ultrasonic wave sensor 24 is mounted to the carriage 33. Thus, the first ultrasonic wave sensor 24 performs scanning with the carriage 33, and thus can detect an amount of moisture contained in the medium 99 along the width of the medium 99.

(9) The second ultrasonic wave sensor 25 is mounted to the carriage 33. Thus, the second ultrasonic wave sensor 25 performs scanning with the carriage 33, and thus can detect an amount of moisture contained in the medium 99 along the width of the medium 99.

Second Embodiment

Next, a second embodiment is described. The second exemplary embodiment is different from the first exemplary embodiment in that the drying device 15 includes the first ultrasonic wave sensor 24, the second ultrasonic wave sensor 25, the first optical sensor 26, the second optical sensor 27, and the electrostatic capacitance sensor 28. With regard to the second exemplary embodiment, differences from the first exemplary embodiment are mainly described.

Figure 8:
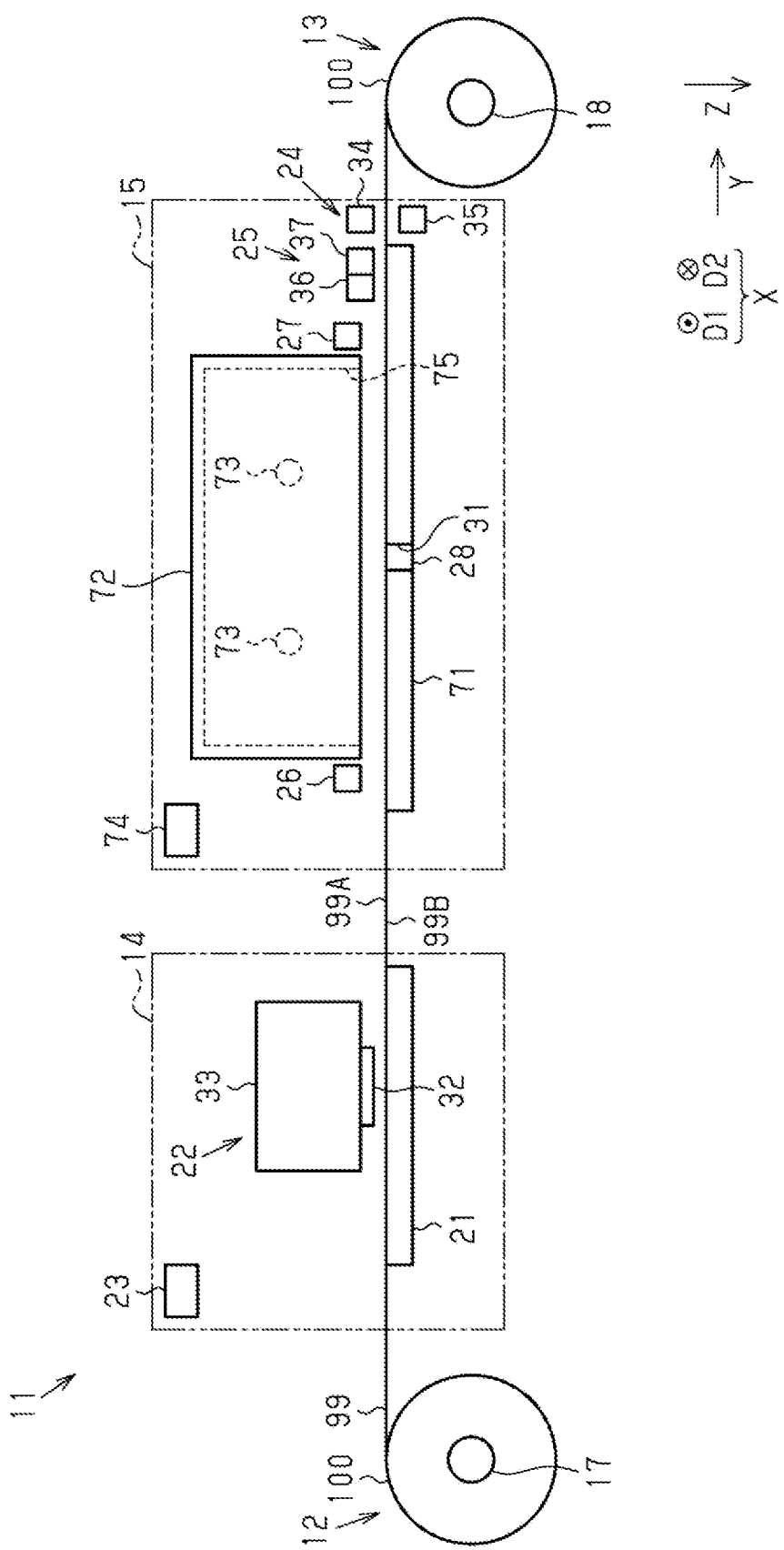
FIG. 8 is a schematic view illustrating a printing system including a processing device of a second exemplary embodiment.

As illustrated in FIG. 8, the drying device 15 includes the second support portion 71, the accommodation body 72, the heating portions 73, and the second control unit 74. The drying device 15 of the second exemplary embodiment includes the first ultrasonic wave sensor 24 and the second ultrasonic wave sensor 25. The drying device 15 of the second exemplary embodiment includes the first optical sensor 26 and the second optical sensor 27. The drying device 15 of the second exemplary embodiment includes the electrostatic capacitance sensor 28.

The second support portion 71 of the second exemplary embodiment has the mounting hole 31 for mounting the electrostatic capacitance sensor 28. For example, the mounting hole 31 is positioned in a region of the second support portion 71, which faces the accommodation body 72. The mounting hole 31 of the second exemplary embodiment is positioned between the two heating portions 73 in the transport direction Y.

The first ultrasonic wave sensor 24 of the second exemplary embodiment is positioned downstream of the second support portion 71 in the transport direction Y. The first ultrasonic wave sensor 24 of the second exemplary embodiment is positioned between the second support portion 71 and the winding device 13 in the transport direction Y.

The first ultrasonic wave sensor 24 detects a basis weight of the medium 99 after being subjected to processing by the heating portions 73. Specifically, the first ultrasonic wave sensor 24 detects a basis weight of the medium 99 after being heated. With this, when the first ultrasonic wave sensor 24 detects a basis weight of the medium 99, an influence of the liquid ejected onto the medium 99 from the head 32 is suppressed. This is because, when a large amount of liquid is contained in the medium 99, it is difficult to detect a basis weight of the medium 99 at high accuracy.

The second ultrasonic wave sensor 25 of the second exemplary embodiment faces the second support portion 71. The second ultrasonic wave sensor 25 is positioned above the second support portion 71. The second ultrasonic wave sensor 25 of the second exemplary embodiment is positioned downstream of the heating portions 73 in the transport direction Y. The second ultrasonic wave sensor 25 of the second exemplary embodiment is positioned between the accommodation body 72 and the first ultrasonic wave sensor 24 in the transport direction Y.

The second ultrasonic wave sensor 25 detects a thickness of the medium 99 after being subjected to processing by the heating portions 73. Specifically, the second ultrasonic wave sensor 25 detects a basis weight of the medium 99 after being heated. With this, when the second ultrasonic wave sensor 25 detects a thickness of the medium 99, an influence of the liquid ejected onto the medium 99 is suppressed. This is because, when a large amount of liquid is contained in the medium 99, the medium 99 swells in some cases, which makes it difficult to detect a thickness of the medium 99 at high accuracy.

The first optical sensor 26 of the second exemplary embodiment is positioned upstream of the heating portions 73 in the transport direction Y. The first optical sensor 26 of the second exemplary embodiment is positioned upstream of the accommodation body 72 in the transport direction Y. The first optical sensor 26 faces the second support portion 71. The first optical sensor 26 is positioned above the second support portion 71.

The first optical sensor 26 detects an amount of moisture contained in the medium 99 before being heated by the heating portions 73. Specifically, the first optical sensor 26 detects an amount of moisture contained in the medium 99 before being subjected to processing by the heating portions 73. More specifically, the first optical sensor 26 detects an amount of moisture contained in the medium 99 after the liquid is ejected thereonto. Thus, the first light source 42 irradiates the medium 99 before being heated by the heating portions 73 with light. The first light receiving portion 43 receives light reflected by the medium 99 before being heated by the heating portions 73.

The second optical sensor 27 of the second exemplary embodiment is positioned downstream of the heating portions 73 in the transport direction Y. The second optical sensor 27 of the second exemplary embodiment is positioned upstream of the accommodation body 72 in the transport direction Y. The second optical sensor 27 faces the second support portion 71. The second optical sensor 27 is positioned above the second support portion 71.

The second optical sensor 27 detects an amount of moisture contained in the medium 99 after being heated by the heating portions 73. Specifically, the second optical sensor 27 detects an amount of moisture contained in the medium 99 after being subjected to processing by the heating portions 73. Thus, the second light source 52 irradiates the medium 99 after being heated by the heating portions 73 with light. The second light receiving portion 53 receives light reflected by the medium 99 after being heated by the heating portions 73.

With the first optical sensor 26 and the second optical sensor 27, change in amount of moisture contained in the medium 99 with respect to processing to which the medium 99 is subjected by the processing portion is detected. Specifically, in the second exemplary embodiment, decrease in amount of moisture contained in the medium 99 with respect to heating to which the medium 99 is subjected by the heating portions 73 is detected.

The electrostatic capacitance sensor 28 of the second exemplary embodiment is mounted to the second support portion 71. The electrostatic capacitance sensor 28 of the second exemplary embodiment is mounted to the mounting hole 31. For example, the electrostatic capacitance sensor 28 is positioned between the first optical sensor 26 and the second optical sensor 27 in the transport direction Y. The electrostatic capacitance sensor 28 of the second exemplary embodiment is positioned between the two heating portions 73 in the transport direction Y.

The electrostatic capacitance sensor 28 of the second exemplary embodiment detects an amount of moisture contained in the medium 99 that is being heated by the heating portions 73. Specifically, the electrostatic capacitance sensor 28 detects an amount of moisture contained in the medium 99 that is being subjected to processing by the heating portions 73. The electrostatic capacitance sensor 28 detects an amount of moisture contained in the medium 99 in the middle of processing.

With the first optical sensor 26, the second optical sensor 27, and the electrostatic capacitance sensor 28, transition of an amount of moisture contained in the medium, which is changed with respect to processing, is detected. With this, decrease in amount of moisture contained in the medium 99 with respect to heating to which the medium 99 is subjected by the heating portions 73 can be detected at high accuracy.

When the heating portions 73 heats the medium 99, the front surface 99A is dried. However, the inner part of the medium 99 is not dried in some cases. In this case, with reference to a detection result of the first optical sensor 26 and a detection result of the second optical sensor 27, it can be grasped that decrease in amount of moisture contained in the medium 99 is more than a heat amount supplied to the medium 99 by the heating portions 73. Meanwhile, with reference to a detection result of the first optical sensor 26 and a detection result of the electrostatic capacitance sensor 28, decrease in amount of moisture contained in the medium 99 is less than a heat amount supplied to the medium 99 by the heating portions 73. Based on the matters described above, it can be described that the medium 99 has characteristics of being less likely to be dried. In this manner, based on a detection result of the first optical sensor 26, a detection result of the second optical sensor 27, and a detection result of the electrostatic capacitance sensor 28, characteristics of the medium 99 can be grasped.

According to the second exemplary embodiment described above, the following effects can be obtained in addition to the effects similar to those in the first exemplary embodiment.

(10) The heating portions 73 being a processing portion subjects the front surface 99A of the medium 99 to processing, which is opposite to the back surface 99B with which the first support portion 21 is brought into contact. Meanwhile, the first light source 42 and the second light source 52 irradiates the front surface 99A with light. According to this, an amount of moisture contained in the front surface 99A of the medium 99 to be subjected to processing can be detected at high accuracy.

(11) The drying device 15 being a processing device includes the electrostatic capacitance sensor 28 and the first ultrasonic wave sensor 24. The first transmission portion 34 and the first reception portion 35 included in the first ultrasonic wave sensor 24 are positioned to sandwich the transported medium 99. When the medium 99 is present between the first transmission portion 34 and the first reception portion 35, an ultrasonic wave transmitted from the first transmission portion 34 passes through the medium 99. In this case, the first reception portion 35 receives an ultrasonic wave passing through the medium 99. When the medium 99 is not present between the first transmission portion 34 and the first reception portion 35, the first reception portion 35 receives an ultrasonic wave transmitted from the first transmission portion 34 as it is. Based on an ultrasonic wave that does not pass through the medium 99 and an ultrasonic wave that passes through the medium 99, transmittance of an ultrasonic wave with respect to the medium 99 is detected. Further, based on transmittance of an ultrasonic wave with respect to the medium 99, a basis weight of the medium 99 is detected. Thus, based on electrostatic capacitance of the medium 99, which is detected by the electrostatic capacitance sensor 28, and a basis weight of the medium 99, which is detected by the first ultrasonic wave sensor 24, an amount of moisture contained in the medium 99 can be detected. With this, an amount of moisture contained in the medium 99 can be detected at high accuracy.

The first exemplary embodiment and the second exemplary embodiment described above may be modified and carried out as described below. The first embodiment, the second embodiment, and the modified examples below may be implemented in combination within a range in which a technical contradiction does not arise.

In place of the mounting hole 31, a recess may be provided in the support portion.

The first transmission portion 34 may constitute both the first ultrasonic wave sensor 24 and the second ultrasonic wave sensor 25. Specifically, the first transmission portion 34 may function as the second transmission portion 36. In this case, for example, the first transmission portion 34 moves in the transport direction Y and the opposite direction. With this, the first transmission portion 34 can transmit an ultrasonic wave to the first reception portion 35, and can transmit an ultrasonic wave to the support portion.

In the second exemplary embodiment, the first ultrasonic wave sensor 24 and the second ultrasonic wave sensor 25 may be positioned at the positions similar to those in the first exemplary embodiment. When the medium 99 before the liquid is ejected thereonto is irradiated with an ultrasonic wave, a basis weight of the medium 99 and a thickness of the medium 99 can be detected at higher accuracy, as compared to a case where the medium 99 after the liquid is ejected thereonto is irradiated with an ultrasonic wave.

The first light shielding portion 44 may be configured to shield the first detection optical path L1 by closing the first opening 45. For example, the first light shielding portion 44 may reflect light emitted from the first light source 42, and thus may cause the light to enter the first light receiving portion 43. In this case, the first light shielding portion 44 may not have the first hole 49.

The second light shielding portion 54 may be configured to shield the second detection optical path L3 by closing the second opening 55. For example, the second light shielding portion 54 may reflect light emitted from the second light source 52, and thus may cause the light to enter the second light receiving portion 53. In this case, the second light shielding portion 54 may not have the second hole 59.

The first state S1 may be a state in which an amount of light passing through the first detection optical path L1 is larger than an amount of light passing through the first reference optical path L2. In this case, the first light shielding portion 44 in the first state S1 shields light advancing through the first reference optical path L2 more than light advancing through the first detection optical path L1.

The second state S2 may be a state in which an amount of light passing through the first reference optical path L2 is larger than an amount of light passing through the first detection optical path L1. In this case, the first light shielding portion 44 in the second state S2 shields light advancing through the first detection optical path L1 more than light advancing through the first reference optical path L2.

The third state S3 may be a state in which an amount of light passing through the second detection optical path L3 is larger than an amount of light passing through the second reference optical path L4. In this case, the second light shielding portion 54 in the third state S3 shields light advancing through the second reference optical path L4 more than light advancing through the second detection optical path L3.

The fourth state S4 may be a state in which an amount of light passing through the second reference optical path L4 is larger than an amount of light passing through the second detection optical path L3. In this case, the second light shielding portion 54 in the fourth state S4 shields light advancing through the second detection optical path L3 more than light advancing through the second reference optical path L4.

The first light source 42 may be configured to emit light having a wavelength that is likely to be absorbed in water and a wavelength that is less likely to be absorbed in water. In this case, of light reflected by the medium 99, intensity of light having a wavelength that is likely to be absorbed in water and intensity of light having a wavelength that is less likely to be absorbed in water are compared. With this, reflectance of light with respect to the medium 99 can be calculated. With this, without causing the light to directly enter the first light receiving portion 43 from the first light source 42, reflectance of light with respect to the medium 99 can be calculated.

The first light source 42 may only include the first light emitting element 46, or may only include the second light emitting element 47. Specifically, the first light source 42 may only include a short-wavelength light emitting element that emits light having a peak wavelength of 940 nm, or may only include a long-wavelength light emitting element that emits light having a peak wavelength of 1,450 nm.

The second light source 52 may be configured to emit light having a wavelength that is likely to be absorbed in water and a wavelength that is less likely to be absorbed in water. In this case, of light reflected by the medium 99, intensity of light having a wavelength that is likely to be absorbed in water and intensity of light having a wavelength that is less likely to be absorbed in water are compared. With this, reflectance of light with respect to the medium 99 can be calculated. With this, without causing the light to directly enter he second light receiving portion 53 from the second light source 52, reflectance of light with respect to the medium 99 can be calculated.

The second light source 52 may only include the third light emitting element 56 or may only include the fourth light emitting element 57. Specifically, the second light source 52 may only include a short-wavelength light emitting element that emits light having a peak wavelength of 940 nm, or may only include a long-wavelength light emitting element that emits light having a peak wavelength of 1,450 nm.

The electrostatic capacitance sensor 28 may be positioned at a position that allows detection of an amount of moisture contained in the medium before being subjected to processing. The electrostatic capacitance sensor 28 is only required to be positioned at a position that is not affected by light emitted from the first optical sensor 26 and the second optical sensor 27.

The position adjusting portion 63 may be electrically driven to be capable of adjusting a position of the electrode pair 62. For example, the position adjusting portion 63 may be an actuator.

The position adjusting portion 63 may be configured to be capable of adjusting a position of the electrode pair 62 with respect to the retaining portion 61. In this case, a position of the electrode pair 62 is also adjusted with respect to the support portion.

The drying device 15 may include an air blowing portion that blows air to the medium 99, in place of the heating portions 73. In this case, the air blowing portion corresponds to a processing portion. Drying of the medium 99 is promoted by blowing air to the medium 99.

The drying device 15 may include an air blowing portion that blows air to the medium 99, in addition to the heating portions 73. In this case, the heating portions 73 and the air blowing portion correspond to processing portions. Drying of the medium 99 is promoted more by blowing air to the medium 99 in addition to heating the medium 99.

Hereinafter, technical concepts and effects thereof that are understood from the above-described exemplary embodiments and modified examples are described.

(A) A processing device includes a first light source and a second light source configured to emit light having a peak wavelength from 900 nm to 2,100 nm, a first light receiving portion configured to receive light emitted from the first light source, a second light receiving portion configured to receive light emitted from the second light source, a support portion configured to support a medium to be transported, and a processing portion configured to subject the medium to processing of increasing or reducing an amount of moisture contained in the medium, the processing portion facing the support portion, wherein the first light source and the first light receiving portion are positioned upstream of the processing portion in a transport direction of the medium to be transported, the first light source irradiates, with light, the medium before being subjected to processing by the processing portion, the first light receiving portion receives light reflected by the medium, the second light source and the second light receiving portion are positioned downstream of the processing portion in the transport direction, the second light source irradiates, with light, the medium after being subjected to processing by the processing portion, and the second light receiving portion receives light reflected by the medium.

When the medium is irradiated with light, the medium, an amount of moisture contained in the medium changes reflectance of light reflected by the medium. Specifically, based on reflectance of light reflected by the medium, an amount of moisture contained in the medium can be detected. According to the configuration described above, with the first light source and the first light receiving portion, an amount of moisture contained in the medium before being subjected to processing is detected. With the second light source and the second light receiving portion, an amount of moisture contained in the medium after being subjected to processing is detected. With this, decrease in amount of moisture contained in the medium with respect to processing or increase in amount of moisture contained in the medium with respect to processing can be detected. Therefore, change in amount of moisture contained in the medium with respect to processing can be detected.

(B) In the processing device described above, at least one of the first light source and the second light source may include a plurality of light emitting elements that emit light having different peak wavelengths.

According to the configuration described above, light having different spectra is radiated on the medium. With this, an amount of moisture contained in the medium can be detected at high accuracy.

(C) In the processing device described above, at least one of the first light source and the second light source may include a short-wavelength light emitting element that emits light having a peak wavelength of 940 nm and a long-wavelength light emitting element that emits light having a peak wavelength of 1,450 nm.

940 nm and 1,450 nm are absorption wavelengths of water. Thus, light emitted from a short-wavelength light emitting element and a long-wavelength light emitting element is likely to be absorbed in water. Therefore, according to the configuration described above, an amount of moisture contained in the medium can be detected at high accuracy.

(D) The processing device described above may further include a first light shielding portion configured to block light emitted from the first light source, wherein light emitted from the first light source may advance through a first detection optical path or a first reference optical path, the first detection optical path being reflected by the medium supported by the support portion and entering the first light receiving portion, the first reference optical path entering the first light receiving portion without being reflected by the medium supported by the support portion, and the first light shielding portion may be configured to be switched between a first state of shielding the first reference optical path without shielding the first detection optical path, and a second state of shielding the first detection optical path without shielding the first reference optical path.

According to the configuration described above, when the first light shielding portion is in the first state, light emitted from the first light source advances through the first detection optical path, and then enters the first light receiving portion. When the first light shielding portion is in the second state, light emitted from the first light source advances through the first reference optical path, and then enters the first light receiving portion. Based on light advancing through the first detection optical path and light advancing through the first reference optical path, reflectance of light with respect to the medium is detected at high accuracy. With this, for example, even when the first light source is degraded over time, an amount of moisture contained in the medium can be detected at high accuracy.

(E) The processing device described above may further includes a second light shielding portion configured to block light emitted from the second light source, wherein light emitted from the second light source may advance through a second detection optical path or a second reference optical path, the second detection optical path being reflected by the medium supported by the support portion and entering the second light receiving portion, the second reference optical path entering the second light receiving portion without being reflected by the medium supported by the support portion, and the second light shielding portion may be configured to be switched between a third state in which the second optical path is prevented from being shielded and the second reference optical path is shielded, and a fourth state in which the second optical path is shielded and the second reference optical path is prevented from being shielded.

According to the configuration described above, when the second light shielding portion is in the third state, light emitted from the second light source advances through the second detection optical path, and then enters the second light receiving portion. When the second light shielding portion is in the fourth state, light emitted from the second light source advances through the second reference optical path, and then enters the second light receiving portion. Based on light advancing through the second detection optical path and light advancing through the second reference optical path, reflectance of light with respect to the medium is detected at high accuracy. With this, for example, even when the second light source is degraded over time, an amount of moisture contained in the medium can be detected at high accuracy.

(F) In the processing device described above, the processing portion may be configured to subject a front surface of the medium to processing, which is opposite to a back surface with which the support portion is brought into contact, and the first light source and the second light source may irradiate the front surface with light.

According to the configuration described above, an amount of moisture contained in the front surface of the medium to be subjected to processing can be detected at high accuracy.

(G) The processing device described above may further include an electrostatic capacitance sensor including an electrode pair and being configured to detect electrostatic capacitance of the medium being held into contact with the electrode pair, and an ultrasonic wave sensor including a transmission portion configured to transmit an ultrasonic wave and a reception portion configured to receive an ultrasonic wave transmitted from the transmission portion, wherein the transmission portion and the reception portion may be positioned to sandwich the medium to be transported.

When the medium is present between the transmission portion and the reception portion, an ultrasonic wave transmitted from the transmission portion passes through the medium. In this case, the reception portion receives an ultrasonic wave passing through the medium. When the medium is not present between the transmission portion and the reception portion, the reception portion receives an ultrasonic wave transmitted from the transmission portion as it is. Based on an ultrasonic wave that does not pass through the medium and an ultrasonic wave that passes through the medium, transmittance of an ultrasonic wave with respect to the medium is detected. Based on transmittance of an ultrasonic wave with respect to the medium, a basis weight of the medium is detected. Thus, according to the configuration described above, based on electrostatic capacitance of the medium, which is detected by the electrostatic capacitance sensor, and a basis weight of the medium, which is detected by the ultrasonic wave sensor, an amount of moisture contained in the medium can be detected. With this, an amount of moisture contained in the medium can be detected at high accuracy.

What is claimed is:

1. A processing device, comprising:
   a first light source and a second light source configured to emit light having a peak wavelength from 900 nm to 2,100 nm;
   a first light receiving portion configured to receive light emitted from the first light source;
   a second light receiving portion configured to receive light emitted from the second light source;
   a support portion configured to support a medium to be transported;
   a processing portion configured to subject the medium to processing of increasing or reducing an amount of moisture contained in the medium, the processing portion facing the support portion; and
   a first light shielding portion configured to block light emitted from the first light source, wherein
   the first light source and the first light receiving portion are positioned upstream of the processing portion in a transport direction of the medium to be transported,
   the first light source irradiates, with light, the medium before being subjected to processing by the processing portion,
   the first light receiving portion receives light reflected by the medium,
   the second light source and the second light receiving portion are positioned downstream of the processing portion in the transport direction,
   the second light source irradiates, with light, the medium after being subjected to processing by the processing portion,
   the second light receiving portion receives light reflected by the medium,
   light emitted from the first light source advances through a first detection optical path, along which the light is incident on the first light receiving portion after being reflected by the medium supported by the support portion, or a first reference optical path, along which the light is incident on the first light receiving portion without being reflected by the medium supported by the support portion, and
   the first light shielding portion is configured to be switched between:
   a first state of shielding the first reference optical path without shielding the first detection optical path; and
   a second state of shielding the first detection optical path without shielding the first reference optical path.

2. The processing device according to claim 1, wherein at least one of the first light source and the second light source includes a plurality of light emitting elements that emit light having different peak wavelengths.

3. The processing device according to claim 2, wherein at least one of the first light source and the second light source includes a short-wavelength light emitting element that emits light having a peak wavelength of 940 nm and a long-wavelength light emitting element that emits light having a peak wavelength of 1,450 nm.

4. The processing device according to claim 1, comprising:
   a second light shielding portion configured to block light emitted from the second light source, wherein
   light emitted from the second light source advances through a second detection optical path, along which the light is incident on the second light receiving portion by being reflected by the medium supported by the support portion, or a second reference optical path, along which the light is incident on the second light receiving portion without being reflected by the medium supported by the support portion, and
   the second light shielding portion is configured to be switched between:
   a third state of shielding the second reference optical path without shielding the second detection optical path; and
   a fourth state of shielding the second detection optical path without shielding the second reference optical path.

5. The processing device according to claim 1, wherein
the processing portion is configured to subject a front surface of the medium to processing, the front surface being opposite to a back surface contacted by the support portion, and
the first light source and the second light source irradiate the front surface with light.

6. The processing device according to claim 1, comprising:
an electrostatic capacitance sensor including an electrode pair and being configured to detect electrostatic capacitance of the medium contacting the electrode pair; and
an ultrasonic wave sensor including a transmission portion configured to transmit an ultrasonic wave and a reception portion configured to receive an ultrasonic wave transmitted from the transmission portion, wherein
the transmission portion and the reception portion are positioned to sandwich the medium to be transported.

* * * * *